US011935044B2

United States Patent
Yoo

(10) Patent No.: US 11,935,044 B2
(45) Date of Patent: Mar. 19, 2024

(54) SYSTEM, METHOD AND PROGRAM FOR PROVIDING FINANCIAL TRANSACTION BY VIRTUAL CODE, VIRTUAL CODE GENERATOR AND VIRTUAL CODE VERIFICATION DEVICE

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 811 days.

(21) Appl. No.: 16/659,043

(22) Filed: Oct. 21, 2019

(65) Prior Publication Data
US 2020/0051075 A1 Feb. 13, 2020

Related U.S. Application Data

(63) Continuation of application No. PCT/KR2018/013410, filed on Nov. 6, 2018.

(30) Foreign Application Priority Data

Aug. 9, 2018 (KR) .................. 10-2018-0093349
Oct. 31, 2018 (KR) .................. 10-2018-0131824

(51) Int. Cl.
*G06Q 20/38* (2012.01)
*G06Q 20/40* (2012.01)
*G06Q 20/32* (2012.01)

(52) U.S. Cl.
CPC ......... *G06Q 20/385* (2013.01); *G06Q 20/409* (2013.01); *G06Q 20/3274* (2013.01)

(58) Field of Classification Search
None
See application file for complete search history.

(56) References Cited

U.S. PATENT DOCUMENTS 6,000,832 A * 12/1999 Franklin ................ G06Q 20/04
235/379
2009/0048971 A1 * 2/2009 Hathaway ............ G06Q 20/346
705/41

FOREIGN PATENT DOCUMENTS

EP          2118805 B1     11/2012
JP       2002-056332 A      2/2002
(Continued)

OTHER PUBLICATIONS

International Search Report issued in PCT/KR2018/013410; dated May 8, 2019.
(Continued)

*Primary Examiner* — Kito R Robinson
*Assistant Examiner* — Shacole C Tibljas
(74) *Attorney, Agent, or Firm* — Studebaker & Brackett PC

(57) ABSTRACT

The virtual code-based financial transaction providing method according to an embodiment of the inventive concept includes a step S200 for receiving a virtual code provided by a virtual code generation means, by a virtual code verification means, a step S400 for extracting multiple detailed codes included in the virtual code by the virtual code verification means, a step S1000 for searching for a storage location of an actual card number on the basis of the multiple detailed codes by the virtual code verification means, and a step S1200 for performing a financial transaction or for making a request for performing a financial transaction with the actual card number extracted from the storage location.

9 Claims, 18 Drawing Sheets

(56) References Cited

FOREIGN PATENT DOCUMENTS

| JP | 2002-157421 A | 5/2002 |
|---|---|---|
| JP | 2002-312707 A | 10/2002 |
| JP | 2012-507767 A | 3/2012 |
| JP | 2018-507582 A | 3/2018 |
| KR | 10-2012-0105296 A | 9/2012 |
| KR | 10-1316466 B1 | 10/2013 |
| KR | 10-1587414 B1 | 1/2016 |
| KR | 10-2016-0036471 A | 4/2016 |
| KR | 10-2016-0119296 A | 10/2016 |
| KR | 10-1675927 B1 | 11/2016 |

OTHER PUBLICATIONS

The extended European search report issued by the European Patent Office dated Feb. 4, 2022, which corresponds to European Patent Application No. 18929370.7 and is related to U.S. Appl. No. 16/659,043.

Communication pursuant to Article 94(3) EPC issued by the European Patent Office dated Sep. 30, 2022, which corresponds to European Patent Application No. 18929370.7 and is related to U.S. Appl. No. 16/659,043.

An Office Action; "Notice of Reasons for Refusal," mailed by the Japanese Patent Office dated Apr. 19, 2022, which corresponds to Japanese Patent Application No. 2021-506625 and is related to U.S. Appl. No. 16/659,043.

\* cited by examiner

SYSTEM, METHOD AND PROGRAM FOR PROVIDING FINANCIAL TRANSACTION BY VIRTUAL CODE, VIRTUAL CODE GENERATOR AND VIRTUAL CODE VERIFICATION DEVICE

CROSS-REFERENCE TO RELATED APPLICATIONS

The present application is a continuation of International Patent Application No. PCT/KR2018/013410, filed Nov. 6, 2018, which is based upon and claims the benefit of priority to Korean Patent Application Nos. 10-2018-0093349 and 10-2018-0131824, filed on Aug. 9, 2018 and Oct. 31, 2018. The disclosures of the above-listed applications are hereby incorporated by reference herein in their entirety.

BACKGROUND

Embodiments of the inventive concept described herein relate to a virtual code-based financial transaction providing system, a virtual code generation device, a virtual code verification device, a virtual code-based financial transaction providing method, and a virtual code-based financial transaction providing program, and more particularly, relate to a system, a method, and a program that may generate a virtual code generated at each time point without duplication and may search for an actual card number based on the virtual code to make a payment, and an device that may generate a virtual code, which is not redundant at each time point and may search for an actual card number based on the virtual code to perform a financial transaction.

Data of a code type is used in a lot of areas. In addition to the card number or account number used to make a payment, the data of a code type includes an IPIN number, a resident registration number, or the like for user identification.

However, the code data may be leaked when this code data is used. In the case of a card number, because the actual card number is recorded on the card surface as it is, the actual card number is visually exposed to other people. Upon making a payment using a magnet, the card number is leaked to other people while being transmitted to a POS device.

The virtual code has been used to prevent the actual card number from being leaked. However, the data for identifying a user is needed to search for the actual card number corresponding to the virtual code. For example, the code of One Time Password (OTP) is changed and generated every time. However, in the case of OTP, a login procedure is needed to determine the algorithm assigned to the user, and it is difficult for OTP to be applied to various areas.

Accordingly, there is a need for a device capable of searching for the real card number based on the virtual code changed in real time, while not providing the identification information about a user or a device corresponding to the real card number.

SUMMARY

The inventive concept provides a virtual code-based financial transaction providing system, a virtual code generation device, a virtual code verification device, a virtual code-based financial transaction providing method, and a virtual code-based financial transaction providing program that may search for an actual card number to have the high security, using the virtual code generated for each virtual code generation means without duplication in a state where the communication between a virtual code generation means and a virtual code verification means is not performed while the whole payment system is not modified as a virtual code maintaining the numeral string format of the actual card number is generated and provided.

The technical problems to be solved by the present inventive concept are not limited to the aforementioned problems, and any other technical problems not mentioned herein will be clearly understood from the following description by those skilled in the art to which the inventive concept pertains.

According to an exemplary embodiment, a virtual code generation device includes a detailed code generation unit generating one or more detailed codes, a virtual code generation unit generating a virtual code by combining the one or more detailed codes, and a virtual code provision unit outputting the virtual code to an outside to provide a virtual code verification means with the virtual code. The virtual code is generated by combining a plurality of codes including a fixed code, an OTP code, and an extraction code depending on a specific rule. The fixed code is a code that is combined at the predetermined location in the virtual code and determines a card issuer or a card type corresponding to an actual card number. The OTP code is generated with the specific number of numeric arrays based on an OTP function and is used to calculate a conversion code. The extraction code is generated with all or part of the number of numbers other than the fixed code and the OTP code in the total number of numbers of the virtual code and corresponds to the conversion code calculated from the OTP code. The conversion code or the extraction code is used as a first code or a second code under a condition set by the virtual code verification means. The first code is to set a start point for searching for a storage location of the actual card number in the virtual code verification means. The second code is to set a search path from the start point to the storage location depending on a specific search method. The OTP code and the extraction code are changed for each unit count. The unit count is set to a specific time interval and is changed as the time interval elapses.

Moreover, in another embodiment, the OTP code is generated as the number of numbers of a card security code in the actual card number, and the extraction code is generated with all or part of the number of numbers other than the fixed code, the OTP code, and an expiration date in the total number of numbers of the virtual code.

Furthermore, in another embodiment, the conversion code is generated with the number of digits the same as the extraction code.

In addition, in another embodiment, the conversion code is one-to-one matched with the OTP code depending on a specific rule.

Also, in another embodiment, the conversion code is calculated by entering a count value, at which generation of the OTP code and the virtual code is requested, into a conversion code generation function as a seed value.

Moreover, in another embodiment, the virtual code generation unit is listed at a digit other than the fixed code and a digit of a card security code in a card identification number by combining the OTP code and the extraction code through a detailed code combining function.

Furthermore, in another embodiment, the detailed code generation unit generates a specific number combination positioned at a digit of an expiration date, as a variable code when the fixed code is newly assigned to the virtual code of a specific card type. The conversion code is generated using the variable code and the OTP code as a seed value. The number combination is changed and generated for each unit count, is capable of being used as an actual expiration date, and is included in a maximum period from a current count.

Also, in another embodiment, the device further includes a virtual code check unit determining whether the virtual code generated at a specific count is a code string capable of being used as the actual card number in a specific card type, when the fixed code is used for the actual card number of the specific card type.

In addition, in another embodiment, the virtual code check unit generates a comparison card security code by entering a card identification number, an expiration date, and a service code within the virtual code into an actual card number generation rule, compares a generation card security code being a number positioned at a digit of a card security code within the virtual code with the comparison card security code, and makes a request for again generating the virtual code when the generation card security code is the same as the comparison card security code.

According to an exemplary embodiment, a virtual code-based financial transaction providing method includes receiving, by a virtual code verification means, a virtual code provided by a virtual code generation means, extracting, by the virtual code verification means, a fixed code and a plurality of detailed codes, which are included in the virtual code depending on a specific rule, calculating, by the virtual code verification means, a conversion code based on the OTP code, searching, by the virtual code verification means, for a storage location of an actual card number based on a first code and a second code, and performing, by the virtual code verification means, a financial transaction progress or a financial transaction progress request, using the actual card number extracted from the storage location. The plurality of detailed codes include an OTP code and an extraction code. Each of the first code and the second code is used under a condition in which the extraction code or the conversion code is set. The virtual code verification means and the virtual code generation means include a same virtual code generation function. The fixed code is a code that is combined at the predetermined location in the virtual code and determines a card issuer or a card type corresponding to the actual card number. The OTP code is generated with the specific number of numeric arrays based on an OTP function and is used to calculate the conversion code. The extraction code corresponds to the first code calculated from the OTP code and is generated with all or part of the number of numbers other than the fixed code and the OTP code in the total number of numbers of the virtual code. The first code is to set a start point for searching for the storage location of the actual card number in a virtual code verification means. The second code is to set a search path from the start point to the storage location depending on a specific search method. The OTP code and the extraction code are changed for each unit count. The unit count is set to a specific time interval and is changed as the time interval elapses.

Furthermore, in another embodiment, the extracting of the detailed code includes extracting a fixed code in an area of a card identification number within the virtual code, setting a detailed code combining function corresponding to a specific card type based on the fixed code, and extracting the OTP code and the extraction code from a numeral string listed at a digit other than a fixed code in the card identification number and a digit of a card security code, using the detailed code combining function.

Moreover, in another embodiment, the extracting of the detailed code includes calculating a count value at which a virtual code is generated by comparing a comparison code, which is generated by the OTP function the same as an OTP function included in the virtual code generation means, with the OTP code. The calculating of the conversion code includes calculating the conversion code by entering the count value and the OTP code as a seed value into a conversion code generation function.

Also, in another embodiment, the virtual code identically includes an expiration date of the actual card number. The virtual code verification means includes an actual card number search algorithm different depending on values of the fixed code and the expiration date The actual card number search algorithm searches for a location, at which the actual card number is stored, based on the first code and the second code.

In addition, in another embodiment, when the fixed code is newly assigned to a virtual code of a specific card type, the extracting of the detailed code includes extracting a variable code from a digit of an expiration date. The calculating of the conversion code includes generating the conversion code by entering the variable code and the OTP code as a seed value into a conversion code generation function.

According to an exemplary embodiment, a program for providing a virtual code-based payment is stored in a medium to execute the above-described virtual code providing method in combination with a computer that is a piece of hardware.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
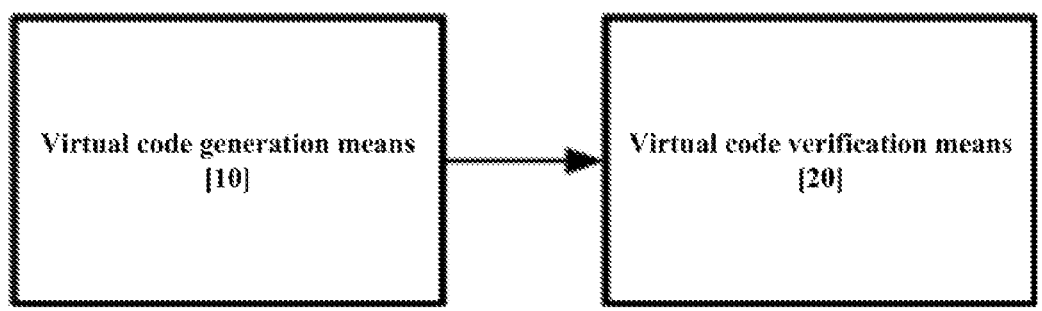
FIG. 1 is a configuration diagram of a virtual code-based financial transaction providing system, according to an embodiment of the inventive concept.

Hereinafter, exemplary embodiments of the inventive concept will be described in detail with reference to the accompanying drawings. The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

In this specification, 'financial transaction' refers to the procedure that takes place between finance companies. The 'financial transaction' includes card payments, deposits or withdrawals from a bank account, or the like.

In this specification, a 'character' is a component of a code and includes all or part of uppercase alphabet characters, lowercase alphabet characters, numerals, and special characters.

In this specification, a 'code' refers to a string of characters.

In this specification, a 'card number' is used for a financial transaction such as a payment, or the like and refers to the number issued to a card and delivered to a card issuer in the case of a payment, the cancellation of a payment, or the like.

In this specification, an 'actual card number' is the number issued by the card issuer to the card of a specific user. That is, the 'actual card number' may mean a number issued for a general real card, a mobile card, or the like.

In this specification, a 'virtual code' may be a card number temporarily generated to be connected to the actual card number and may be a code of specific digits composed of characters including numbers. The 'virtual code' includes a virtual card number for searching for an actual card number stored in a financial company server and a virtual token for searching for the actual card number stored in a virtual token verification server.

In this specification, a 'detailed code' refers to a part of codes included in the virtual code. That is, when the virtual code is generated by combining the separately generated a plurality of code, the detailed code refers to a respective code constituting the virtual code after the respective code is separately generated.

In this specification, the 'unit count' is a unit set to a specific time interval and is defined to change as the time interval elapses. For example, 1 count may be used after being set to a specific time interval (e.g., 1.5 seconds).

In this specification, a 'virtual code generation function' refers to the function used to generate the virtual code.

In this specification, a 'payment card' refers to a card capable of changing and outputting a card number.

In this specification, 'cloud movement' means that an object performs both rotational and translational movements. That is, the 'cloud movement' moves while performing both rotational and translational movements, and means that each point of the rotating object moves in contact with the moving axis sequentially.

In this specification, a 'payment settlement service server' includes all of the servers of the operator that connects or assists the payment service between a virtual token generation device and a store terminal device or between a virtual token verification server or a financial company server. That is, the payment settlement service server may correspond to all of a payment gateway (a service operator that acts on behalf of the transactions with financial institutions on Internet), VAN, the server of Acquirer, or the like.

In the specification, the 'virtual token verification server' refers to a server that stores an actual card number, searches for the actual card number based on the virtual token, and provides the payment service server or a financial company server with the actual card number.

In this specification, a 'financial company server' refers to a server that determines whether a payment is approved, based on the actual card number.

Hereinafter, according to an embodiment of the inventive concept, the configuration of the actual card number will be described to explain the process of generating a virtual code to substitute the actual card number and the process of searching for an actual card number.

The 'actual card number' includes at least one of a card identification number, a card security code, or an expiration date. The card identification number is the code assigned to identify a card issuer, a card type, and a user of a card. Generally, the card identification number provided to a card has 15 or 16 digits. Moreover, in general, in the case of the card identification number of 16 digits, the first six digits constitute the issuer identification number (IIN or BIN) of the card; the digits from the seventh digit to the fifteenth digit constitute the code provided by each card issuer to each card depending on an arbitrary rule; the 16th digit is a value (check digit) for verifying the card identification number by a specific formula.

The card security code is composed of the numbers on specific digits (e.g., 3 digits in the case of Visa or Master card and 4 digits in the case of AMEX card) printed on one side of the card, and is a code for determining whether the card number is normal. That is, in the case where the card security code has 3 digits and the card identification number has 16 digits, when 3-digit code being the card security code and 16-digit code being the card identification number are encrypted/decrypted depending on a predetermined rule and then the card is a normal card, when the corresponding value is matched. The card security code is referred to as a Card Verification Value (CVV) for Visa, Card Validation Code (CVC) for Master Card/JCB, and Confidential Identifier Number or Card Identification Number (CID) or American Express.

The expiration date refers to the date usable after which the actual card number is issued. Generally, the expiration date is composed of four digits having two digits for each year or month. Because the magnetic card includes the actual card number as it is, the whole card number may be leaked by only reading out the magnetic card. The use of magnetic cards has been recently restricted over the world, and the magnetic card is being converted into a high-security card like an IC card. For the purpose of applying other high-security methods, a new terminal needs to be installed or the magnetic card needs to be changed to be different from the conventional process. Accordingly, a method for preventing a card number leakage is needed while the same process is applied using the conventional actual card number. In particular, it is necessary to improve security while the conventional magnetic card reader is used as it.

Hereinafter, according to an embodiment of the inventive concept, a virtual code-based financial transaction providing system, a virtual code generation device 100, a virtual code verification server 200, a virtual code-based financial transaction providing method, and a virtual code-based financial transaction providing program will be described in detail with reference to drawings.

FIG. 1 is a configuration diagram of a virtual code-based financial transaction providing system, according to an embodiment of the inventive concept.

Figure 2:
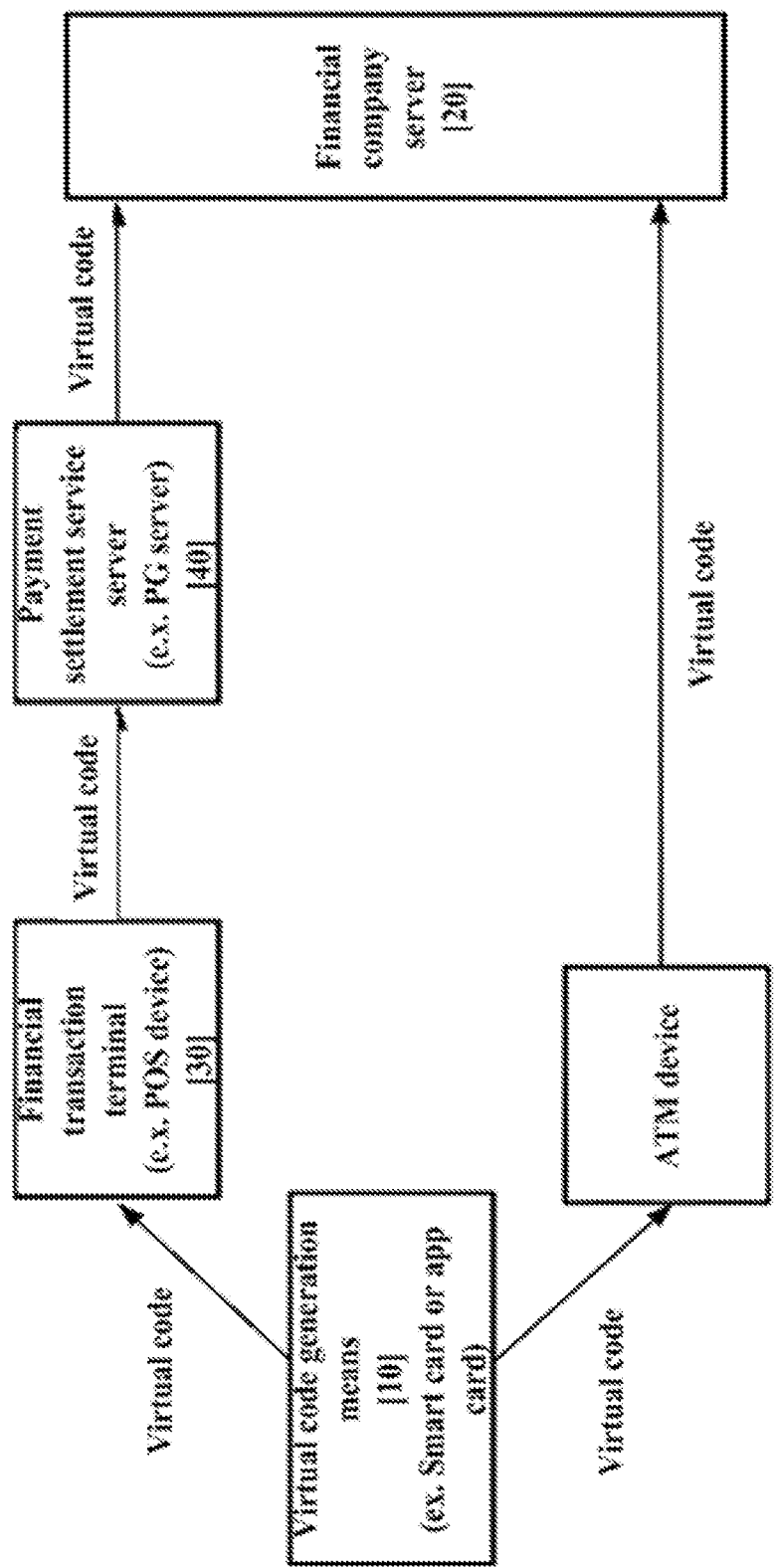
FIG. 2 is an exemplary diagram illustrating a procedure in which a virtual code is provided from a virtual code generation means to a financial company server, according to an embodiment of the inventive concept.

FIG. 2 is an exemplary diagram illustrating a procedure in which a virtual code is provided from a virtual code generation means to a financial company server, according to an embodiment of the inventive concept.

Referring to FIG. 1, a virtual code-based financial transaction providing system includes a virtual code generation means 10 and a virtual code verification means 20.

The virtual code generation means 10 generates a virtual code including information through which the virtual code verification means 20 is capable of searching for an actual card number. That is, the virtual code generation means 10 generates the virtual code depending on a virtual code generation function. At this time, because the virtual code verification means 20 searches for an actual card number based on the virtual code, the virtual code generation means 10 may not store the actual card number. In this way, the actual card number may be prevented from leaking through the hacking of the virtual code generation means 10. The detailed description about the virtual code generation function will be given later.

The virtual code verification means 20 searches for actual card number based on the virtual code received from the virtual code generation means 10. The virtual code verification means 20 stores the virtual code generation function the same as the virtual code generation means 10 to search for the actual card number from the virtual code received from the virtual code generation means 10. The detailed description about the method in which the virtual code verification means 20 searches for the actual card number based on the virtual code will be given later.

Furthermore, the virtual code verification means 20 verifies whether the virtual code is a code normally generated by the virtual code generation means 10. The detailed description about the method in which the virtual code verification means 20 determines whether a virtual code is normal will be given later.

The virtual code verification means 20 may receive the virtual code from the virtual code generation means 10 in various manners. In an embodiment, the virtual code verification means 20 may receive the virtual code from the virtual code generation means 10 via wireless communication. For example, when the virtual code generation device 100 including the virtual code generation means 10 includes an NFC antenna module, a Bluetooth communication module, or the like, the virtual code generation device 100 may transmit the virtual code to be delivered to the virtual code verification server, to the financial transaction terminal through communication with the financial transaction terminal. In another embodiment, the virtual code verification server 200 may directly enter (e.g., enter the virtual code onto a web page or the payment page of an application) the virtual code generated by the virtual code generation device 100 into a mobile terminal connected to the virtual code verification server 200 through the communication. At this time, the virtual code verification means 20 may receive the virtual code from another server receiving the virtual code from the virtual code generation means 10.

In particular, as illustrated in FIG. 2, in the case where the virtual code generation means 10 is a smart card capable of making a payment with a payment terminal and in the case where the virtual code verification means 20 is a card issuer server (a virtual code verification server) 20 including a virtual code generation function, when making a payment with the smart card being the virtual code generation means 10 in a POS device 30, the virtual code verification means 20 may receive the virtual code from a PG server 40 receiving the virtual code from the POS device 30. That is, the virtual code verification means 20 (i.e., the card issuer server) may receive the virtual code from the virtual code generation means 10 instead of the actual card number using the conventional payment process. That is, as described later, when the virtual code is generated as a code having a length the same as the length of the actual card number, a virtual code-based payment providing method according to an embodiment of the inventive concept may be applied to a process proceeding from the virtual code generation means to a server including the virtual code verification means without changes. Furthermore, when performing a financial transaction through an ATM device with a smart card that is a virtual code generation means, the virtual code generation means 10 provides the ATM device with the virtual code generated as the code of the same length as the actual card number and the financial company server 20 may receive the virtual code from the ATM device to proceed with the financial transaction.

Moreover, according to an embodiment, each of the virtual code verification means 20 and the virtual code generation means 10 includes the same virtual code generation function. As each of the virtual code verification means 20 and the virtual code generation means 10 includes the same virtual code generation function (i.e., the detailed code combining function to be described later), the virtual code verification means 20 may properly extract a plurality of detailed codes from the virtual code generated by the virtual code generation means 10.

Moreover, in another embodiment, the virtual code verification means 20 may verify whether the received virtual code is generated and received by the normal virtual code generation means 10. That is, after the virtual code verification means 20 generates a code (i.e., a virtual code or a specific detailed code) in a condition the same as the condition in the case of the virtual code generation means 10, the virtual code verification means 20 may perform verification by comparing the code (i.e., a virtual code or a specific detailed code) received by the virtual code generation means 10.

Figure 3:
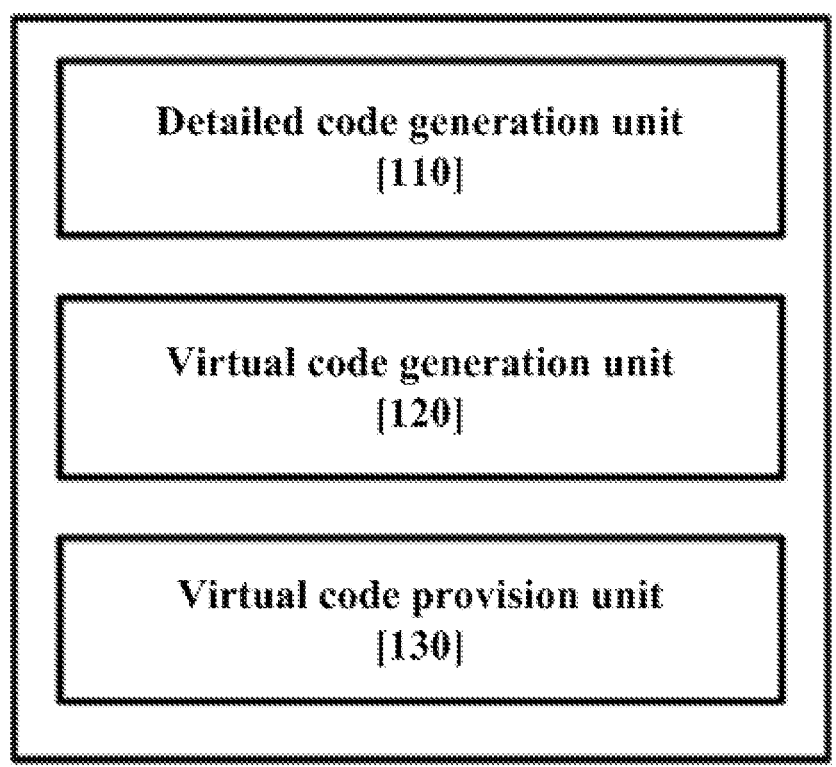
FIG. 3 is a configuration diagram of a virtual code generation device, according to an embodiment of the inventive concept.

FIG. 3 is a configuration diagram of a virtual code generation device 100, according to another embodiment of the inventive concept.

Figure 5A:
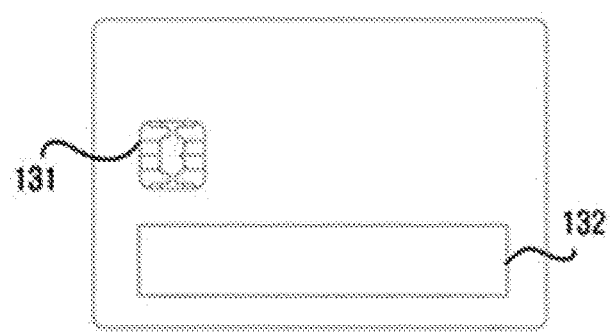
FIGS. 5A to 5C are exemplary diagrams of a virtual code generation device, according to an embodiment of the inventive concept.
Figure 5B:
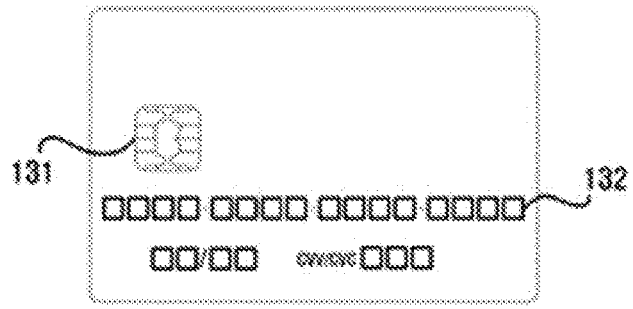
Figure 5C:
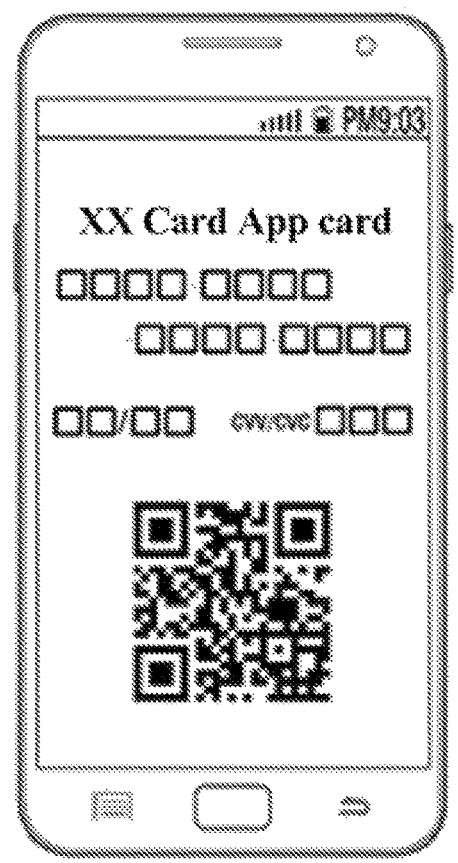

FIGS. 5A to 5C are exemplary diagrams of a virtual code generation device, according to an embodiment of the inventive concept.

Referring to FIG. 3, according to another embodiment of the inventive concept, the virtual code generation device 100 includes a detailed code generation unit 110, a virtual code generation unit 120, and a virtual code provision unit 130.

According to embodiments of the inventive concept, the virtual code generation device 100 may be a device, in which the program corresponding to the virtual code generation means 10 is embedded or in which a program corresponding to the virtual code generation means 10 is installed. For example, the virtual code generation device 100 may be a smart card equipped with the program corresponding to the virtual code generation means 10. Moreover, for example, the virtual code generation device 100 may be a mobile terminal in which an app card application corresponding to the virtual code generation means 10 is installed. In addition to the above-described illustration, the virtual code generation device 100 may be a device that generates and transmits a virtual code.

The virtual code generation unit 120 may generate the virtual code by combining one or more detailed codes. According to an embodiment, the virtual code may be generated by combining a plurality of detailed codes depending on a specific rule. The virtual code generation function includes the rule (i.e., the detailed code combining function) that combines a plurality of detailed codes.

Various methods may be applied to the method of generating a single virtual code by combining the plurality of detailed codes. As the example of the detailed code combining function, the virtual code generation unit 120 may generate the virtual code in the manner of alternately positioning the first code of N-digits and the second code of N-digits. Furthermore, for another example, the detailed code combining function may be a function that combines the second code behind the first code. As the length of the detailed code included in a virtual function increases, the detailed code combining function may be generated variously.

Furthermore, as described later, the virtual code generation unit 120 combines the fixed code to a specific location in the virtual code (e.g. the first six digits of the card identification number in the virtual code). The fixed code is a code that is combined at the predetermined location in the virtual code and determines the card issuer or the card type corresponding to the actual card number.

In particular, the virtual code may include the unchanged fixed code for distinguishing groups, together with a plurality of detailed codes. The virtual code verification means 20 may include several virtual code generation functions corresponding to several groups, respectively; when the virtual code is received from the virtual code generation device 100, the virtual code verification means 20 needs to search for the actual card number based on the virtual code generation function of the group to which the corresponding virtual code generation device 100 belongs. When the whole code includes only the detailed code newly generated whenever a unit count elapses without including the fixed code, the group to which the virtual code generation device 100 belongs may not be determined without separate information. Accordingly, the virtual code generation device 100 includes the unchanged fixed code for identifying a group.

For example, when the virtual code generation function is assigned for each card type of a specific card issuer, the virtual code generation device 100 may use 6 digits indicating the card issuer and the card type, in the preceding numbers of the card number, as the fixed code and the virtual code verification means 20 may identify the specific card type of the specific card issuer to which the virtual code generation function the same as the virtual code generation device 100 is applied. That is, the fixed code refers to a code for determining the card issuer or the card type corresponding to the actual card number.

Moreover, the fixed code may be combined at the predetermined location within the virtual code. When the virtual code generation function is assigned for each card type group, the virtual code verification means 20 may extract the fixed code from the virtual code and then may determine a card type group. Accordingly, the fixed code may be combined at predetermined location (e.g., a location the same as the issuer identification number of the actual card number) within the virtual code so as to be detachable without the separate function.

The detailed code generation unit 110 may generate one or more detailed codes.

In an embodiment, the detailed code generation unit 110 may generate the first code and the second code, which are used to search for the actual card number in the virtual code verification means 20. That is, the virtual code generation unit 120 generates the virtual code including the combination of the first code and the second code, which are generated in the detailed code generation unit 110.

In an embodiment, the detailed code generation unit 110 includes a first function and a second function as detailed code generation functions to generate a first code and a second code. The first code and the second code may have the correlation for searching for the storage location of the actual card number in the virtual code verification means 20. However, the virtual code generation device 100 may only include the first function to generate the first code and the second function as the detailed code generation functions to generate the second code to improve security, and may not include the data about the correlation between the first code and the second code.

Moreover, according to an embodiment, the virtual code generation device 100 may generate the detailed code so as to be the code of the same digits as the actual card number by combining a plurality of detailed codes and the fixed code. The virtual code generation device 100 needs to generate a code having the same digits as the actual card number as the virtual code, for the purpose of using the virtual code while the conventional financial transaction system (e.g., when the financial transaction is a payment in a store, a POS device and a PG server) is maintained as it is. To this end, the virtual code generation device 100 utilizes the digits of a plurality of detailed codes by dividing digits other than the fixed code for determining the card issuer and the card type of the corresponding card issuer. For example, when the actual card number has the card identification number of 16 digits and includes the first code and the second code as the detailed code, the virtual code generation device 100 may generate the first code and the second code, each of which has 5 digits, by identically dividing 10 digits other than the fixed code of 6 digits among 16 digits. Afterward, the virtual code generation unit to be described later may combine the first code and the second code depending on the specific rule and then may combine the fixed code with the front portion of the card identification number of the actual card number to generate the card identification number of the virtual code.

Moreover, for example, the virtual code composed of the detailed code may be generated using the digits of the card identification number of the card number and an expiration date. That is, in the card identification number of 16 digits and the expiration date of 4 digits, the virtual code generation device 100 may maintain 6 digits corresponding to the issuer identification number of the actual card number as the fixed code and then may allocate the remaining 14 digits to a plurality of detailed codes. The detailed code generation unit may generate the detailed code matched with each of the allocated digits.

Moreover, for example, the virtual code generation device 100 may utilize the card identification number, the expiration date, and the card security code of the actual card number as the digit to be allocated to the detailed code in the virtual code. For example, the virtual code generation device 100 may maintain 6 digits corresponding to the issuer identification number of the actual card number as the fixed code and may allocate the remaining 10 digits of the card identification code, 4 digits of the expiration date, and 3 digits of the card security code to each detailed code as the digit.

Moreover, for example, the virtual code generation device 100 may express the detailed code and the fixed code of the virtual code, using only the portion of the card identification number. At this time, the virtual code generation device 100 may differently allocate the number of digits to a plurality of detailed codes. That is, when the virtual code includes the fixed code, the first code, and the second code and generates the fixed code, the first code, and the second code by using only the number of digits of the card identification number, the virtual code generation device 100 may divide 9 digits among the number of digits other than 6 digits to be allocated to the fixed code into the first code and the second code and then may allocate the divided result. In all of the case where the card identification number has 15 digits and the case where the card identification number has 16 digits, the virtual code generation function may allocate only 9 digits of the card identification number to the first code and the second code. For example, the virtual code generation function may allocate 6 digits among 9 digits to the first code and may allocate 3 digits among 9 digits to the second code. As such, when codes constituting the virtual code is expressed using only the portion of the card identification number in the whole card number, the number of texts to be entered may be reduced when a user needs to directly enter the card number. Moreover, the virtual code generation device 100 may utilize the portions of the expiration date and the card security code for other purposes to improve security.

Also, in one embodiment including the first code and the second code in the virtual code, the virtual code further includes a virtual security code. For example, the virtual code includes a plurality of detailed codes and the virtual security code. The security code of the virtual code may be provided using the digit of the card security code (i.e., CVV or CVC) of the actual card number. That is, the virtual code generation device may allocate the digit of the card security code to the virtual security code of the virtual code and may allocate all or part of digits of the card identification number and the expiration date to a plurality of detailed codes so as to include the same number of texts as the actual card number used by the conventional financial transaction system.

The security code is a code generated based on the specific security code generation function and is used to verify whether a virtual code is normal. The security code generation function generates the security code of the specific digits, using time data and the unique value of the virtual code generation means as a function value.

An example of a procedure of determining whether a virtual code is normal, using the virtual security code is as follows. The virtual code verification means 20 may receive the unique value (e.g., the chip unique value in the smart card, the unique value of a smartphone installed in an app card, or the like) of the virtual code generation device 100 upon issuing the actual card number to store the unique value in the storage location of the actual card number or may store the unique value in a separate storage space connected to the storage location of the actual card number. When the virtual code generation device 100 generates the virtual code, with which the virtual security code is combined, to provide the virtual code to the virtual code verification means 20, the virtual code verification means 20 may obtain time data at which the virtual code is generated, based on the detailed code, may extract the unique value of the specific virtual code generation device 100 stored therein, may apply the extracted unique value together with the time data to the virtual security code generation function (e.g., OTP function), and may generate the virtual security code. The virtual code verification means 20 may determine whether the virtual security code (i.e., the reception virtual security code) received by the virtual code generation device 100 is the same as the virtual security code (i.e., the generated virtual security code) calculated using the virtual security code generation function stored therein. Because there is a difference between a time point at which the virtual code generation device 100 generates a virtual code and a time point at which the virtual code verification device 200 receives the virtual code, the virtual code verification device 200 may calculate the virtual security code (i.e., OTP number) within a specific time range (e.g., from a time point, at which the virtual code is received, until a specific count) in consideration of time delay and may determine whether there is a value the same as the reception virtual security code received from the virtual code generation device 100. When the reception virtual security code is the same as the generation virtual security code, the virtual code verification means 20 may determine whether the virtual code is normal and then may provide the actual card number.

For example, the virtual security code may be generated to have the number of digits corresponding to the card security number. That is, the virtual code generation device 100 may generate 3 digits or 4 digits corresponding to the card security number as the virtual security code, using the virtual security code generation function; when the virtual security code is entered as the card security number upon using a card, the virtual code verification means 20 may verify the virtual security code.

Moreover, for another example, the virtual security code generation function may generate the code of '1' digits (1' is a natural number) changed for each count to apply the code as a function value together. That is, the virtual security code generation function may include a random code generation function (e.g., the OTP function to generate a code of '1' digits) of '1' digits.

Furthermore, in an embodiment, when the virtual code is generated through the combination according to the specific rule of the first code and the second code, the first code and the second code may have a role of searching for the storage location at which the actual card number is stored. For example, the first code is set to the start point of the storage location search, and the second code is set to the search path from the start point to the storage location depending on a specific search method. That is, when the virtual code generated normally for each unit count is provided from the virtual code generation device 100, the virtual code verification device 20 determines that a point moving along the search path corresponding to the second code from the search start point corresponding to the first code is the storage location of the actual card number. The detailed method of searching for the storage location based on the first code and the second code constituting the virtual code will be described later.

As an embodiment of a method in which the detailed code generation unit 110 generates the detailed code, the detailed code generation unit 110 generates a new detailed code for each unit count, and thus the virtual code generation device 100 generates a new virtual code for each unit count. The virtual code newly generated for each unit count is not generated redundantly. In particular, the detailed code generating unit 110 is configured such that the virtual code newly generated for each unit count is not redundantly generated between users belonging to a specific group as well as not being generated during a specified duration for a specific user or specific the virtual code generating device 100.

As the detailed embodiment of preventing the virtual code from being generated redundantly, when generating the first code or the second code of N digits by using M characters, the detailed code generation function included in the virtual code generation function may generate $M^N$ codes as the first code or the second code and may match each code for each count from the initial time point at which the detailed code generation function is operated. For example, when setting the unit count to one second, the detailed code generation function matches $M^N$ different codes every second from the first driven time point. Moreover, when the period of using the specific detailed code generation function or the usage period (e.g., the expiration date of a smart card generating the virtual code) of the virtual code generation device 100 is set to be shorter than the time length (e.g., $M^N$ seconds in the case where 1 count is 1 second) corresponding to $M^N$ count, the first code or the second code is not redundantly generated during the usage period. That is, when the count increases with time, in the case where a user requests the virtual code generation device 100 to generate a virtual code at a specific time point, the virtual code generation device 100 may generate a code value matched with a count corresponding to a specific time point, as the first code or the second code.

In particular, when alphabetic uppercase characters and numbers from 0 to 9 are used as characters capable of being included in a code (i.e., using 36 characters) and 6 digits are respectively assigned to first and second codes by using the digits of the card identification number and the expiration date of the actual card number, the virtual code generation device 100 may provide $36^6$ codes as the first code and the second code. At this time, the virtual code generating device 100 may provide the first code and the second code, which are changed for each count, by matching each code for each count.

As the detailed embodiment of preventing the virtual code from being generated redundantly, when the usage period of the virtual code generation device 100 elapses, the virtual code, the usage period of which is different from the previous usage period may be generated by changing the function (i.e., the first function or the second function) to generate the first code or the second code or by changing the matching relationship between the first code and the second code. In the case where the first code generated by the first function and the second code generated by the second function are combined in the virtual code, when the first code generation function or the second code generation function are changed, the virtual code generation device 100 may apply the virtual code generation function to generate the virtual code different from the previous period to a new usage period as the order in which the first code or the second code appears differs from the order in the previous usage period. Furthermore, the virtual code generation device 100 may select the first function and the second function such that a code the same as the virtual code used in the previous usage period does not appear as the virtual code of each count in a new usage period (i.e., such that the matching relationship between the first code generated depending on the first function and the second code generated depending on the second function is not included in the matching relationship included in the previous usage period, at all counts in the new usage period). That is, after the usage period capable of applying $M^N$ codes once elapses, the virtual code generation function in a new usage period, which overlaps with the previous usage period and in which the virtual code is not generated may be applied through adjusting of updating the virtual code generation function.

At this time, the virtual code generation means 10 and the virtual code verification means 20 may store a rule of updating a virtual code generation function. That is, the virtual code generation means 10 and the virtual code verification means 20 may store an order or rule for applying the plurality of first and second functions to each usage cycle.

Furthermore, as the detailed other embodiment of preventing the virtual code from being generated redundantly, one of the first code or the second code included in the virtual code may be generated by reflecting a value (i.e., a device identification value) present for each virtual code generation device 100 at the same time point such that the same virtual code is not generated between users belonging to the same group at the same time point. In an embodiment, the device identification value may be the elapsed time (or the number of counts) from the time point (e.g., the time point at which the detailed code generation function starts to be applied to the specific virtual code generation device 100 after a specific time elapses from the first time point at which the specific detailed code generation function is driven in the virtual code verification means 20), at which the specific virtual code generation device 100 is included in a group to which the specific detailed code generation function is applied, to the present. In the case where a plurality of virtual code generation devices 100 are included in a single group, when the counts, each of which allows the virtual code generation device 100 to belong to the corresponding group, are not the same as one another (i.e., the virtual code generation devices 100 do not belong to the corresponding group at the same time), the time elapsing from a time point (or count), at which the virtual code generation devices 100 belong to the group, to a specific time point may be different for the respective virtual code generation devices 100. Accordingly, at least one of the detailed code generation functions may allow the virtual codes generated by each of the virtual code generation devices 100 to be different for each time point, using the time elapsing from the time point (or count), at which the virtual code generation devices 100 belong to the group, to a specific time point as a device identification value. As such, the virtual code verification means 20 may distinguish the virtual code generation device 100 only by receiving the virtual code without separately receiving the data for distinguishing the user.

For example, when the virtual code generation device 100 is a card (e.g., a smart card, an app card, or the like) capable of changing the output card number, a specific card type of a specific card issuer is set to a group, and the specific virtual code verification means 20 in the card issuer server is operated for the corresponding group. When a first user requests the first virtual code generation device 100 (i.e., the virtual code generation device 100 of the first user) to issue a card at a time point elapsing by 'A' time from a point in time when the virtual code verification means 20 is driven and when a second user requests the second virtual code generation device 100 (i.e., the second virtual code generation device 100) to issue a card at a time point elapsing by 'B' time ('B' is a value time greater than 'A') from a point in time when the virtual code verification means 20 is driven, in the first virtual code generation device 100 and the second virtual code generation device 100, the time length elapsing from a point in time when a card is issued may be different at 'C' time ('C' is a value time greater than 'B') when the virtual code generation is requested from the first user and the second user. Accordingly, the detailed code generation function applies the time length elapsed from a point in time when the card is issued in each of the virtual code generation devices 100, as a variable, thereby preventing the same virtual code from being generated at the same time point.

Moreover, because the time length elapsing from the time point, at which a specific virtual code generation device 100 belongs to a specific group, continuously increases with time, the detailed code (e.g., the second code) generated by the specific virtual code generation device 100 is not generated as the same value but is continuously generated as a different value.

Furthermore, as the detailed other embodiment of preventing the virtual code from being generated redundantly, such that a redundant virtual code is not generated in the whole period regardless of the user, the first code may be set as a code value corresponding to a time point (or count) at which the generation of a virtual code is requested, among codes matched for each count from an initial time point at which the first function is driven within the virtual code verification means 20, the second code may be set as a code value generated by reflecting a value (i.e., a device identification value) that always differently exists at the same time point for each of the virtual code generation devices 100, and the virtual code may be used as a code value obtained by combining the first code and the second code. Because the first code has a different code value for each count and the second code has a different code value for each of the virtual code generation devices 100 at the same time point, the virtual code obtained by combining the first code and the second code may be output as a different code value for all of the virtual code generation devices 100 at all points in time.

Furthermore, in another embodiment, one of a plurality of listing rules that lists M characters in ascending order may be applied to the virtual code generation function (or the detailed code generation function). That is, the virtual code generation device 100 (i.e., the virtual code generation means 10) may variously apply rules for listing M characters in ascending order, to the detailed code generation function included in the virtual code generation function. For example, the listing rule for listing uppercase alphabetic characters in ascending order may be the order of A, B, C, . . . , and Z that is the general order or may be the order of A, C, B, . . . , and Z. As the listing rule is changed by the virtual code generation function, the order in which the codes are matched sequentially is different for each count from the initial time point at which the virtual code generation function is operated. The virtual code verification means 20 may include and store the code generated depending on the same listing rule, which is matched with each count, or the same listing rule itself, in the virtual code generation function. Accordingly, the virtual code generation function for each group may include different detailed code combining functions or different character listing rules, to have different virtual code generation functions for each group.

Furthermore, in another embodiment, the detailed code generation unit 110 generates a plurality of detailed codes capable of being used to be changed to the first code and the second code, which are used to searched for the actual card number by the virtual code verification server 200. The virtual code generation function includes each detailed code generation function. For example, the virtual code generation function generates a plurality of detailed codes, using a plurality of detailed code generation functions and generates a virtual code, using the detailed code combining function to combine the plurality of detailed codes.

In an embodiment, the detailed code generation unit 110 generates the OTP code and extraction code, which are included in the virtual code. That is, the virtual code is generated by combining a plurality of codes including the fixed code, an OTP code and an extraction code depending on a specific rule. To this end, the virtual code generation function may include an OTP function to generation an OTP code, an extraction code generation function, and a detailed code combining function.

Figure 4:
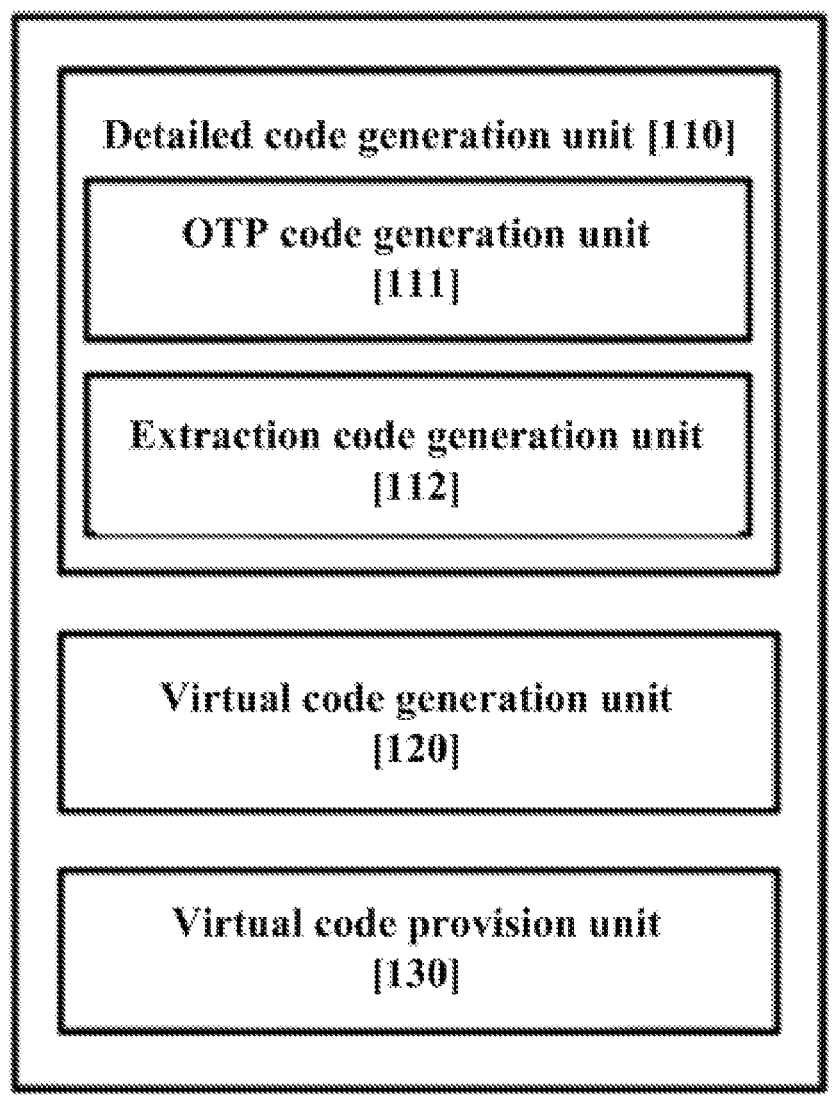
FIG. 4 is a configuration diagram of a virtual code generation device, according to another embodiment of the inventive concept.

In an embodiment, as illustrated in FIG. 4, the detailed code generation unit 110 includes an OTP code generation unit 111 and an extraction code generation unit 112.

The OTP code generation unit 111 generates the OTP code based on an internally stored OTP function at a point in time when virtual code generation is requested. The OTP code generation unit 111 generates the OTP code by reflecting the count (I.e., at a point in time when the generation of the virtual code corresponding to the actual card number is requested by the user for the financial transaction) requested to generate the OTP code based on the specific seed data (or serial number). The OTP code is generated with the specific number of numeric arrays based on the OTP function and is used to calculate the conversion code. That is, when the virtual code is transmitted to a virtual code verification means (e.g., a virtual code verification server), the virtual code verification means may use the conversion code as the first code or the second code, which are used to search for an actual card number storage location after searching for the conversion code based on a virtual code OTP number.

In an embodiment, the OTP code generation unit 111 may use the count, at which a financial company server issues the actual card number to a specific user or the actual card number is registered in a virtual token verification server, as the seed data of the OTP function. That is, the virtual code verification means (i.e., a financial company server or a virtual token verification server) may use actual card number issuance count or actual card number registration count, which is distinguished for each user, as the seed data. In this way, the virtual code verification means may search for the count at which the actual card number is issued or registered, using the OTP code extracted from the virtual code. Moreover, in this way, the OTP code generation unit 111 may operate the OTP function, using the different seed data because the count at which the actual card number of another user is registered or issued is different. That is, the OTP code generation unit 111 may generate different OTP codes at the same time point for each user as the count at which different actual card numbers are registered or issued to each user is used as the seed data.

The OTP code generated by the OTP code generation unit 111 is used to calculate the conversion code used as the first code or the second code in the virtual code verification server 200. That is, the OTP code is used to generate a specific conversion code after being entered into a conversion code generation function as the seed value. The conversion code generation function is stored in the virtual code verification server 200. Furthermore, when the conversion code is used as the seed value in the extraction code generation function, the extraction code generation unit 112 to be described later may include the conversion code generation function to generate the conversion code as the OTP code generated by the OTP code generation unit 111.

In an embodiment, the conversion code may be matched one-to-one with the OTP code depending on a specific rule. That is, the conversion code generation function may form a one-to-one matching relationship between the OTP code, of which digits are different, and the conversion code.

Also, in another embodiment, the conversion code is calculated by entering a count value, at which the generation of the OTP code and a virtual code is requested, into the conversion code generation function as the seed value. That is, the conversion code generation function may use the count value, at which the generation of the OTP code and the virtual code is requested, as the seed value, and thus the conversion code, which is different depending on the count value, may be generated even though the same OTP value is used as the seed value. In this way, when the OTP code is the numeral string, of which the number of digits is less than the conversion code, the conversion code, of which the number of digits is greater than the OTP code, may be used as the first code or the second code used to search for the actual card number storage location.

Also, in another embodiment, when the fixed code is newly assigned to the virtual code of a specific card type, the detailed code generation unit 110 may generate the specific number combination positioned at the digit of the expiration date, as a variable code and may use both the variable code and the OTP code as the seed value (i.e., variable) of the conversion code generation function. That is, the conversion code is generated using the variable code and the OTP code as a seed value.

The number combination positioned at the digit of the expiration date is changed for each unit count and then is generated; the number combination is capable of being used as actual expiration date and is included in the maximum period from the current count. The expiration date needs to be a value within the effective period from the current time point to avoid an error in a payment system. For example, when the expiration date of the actual card is 5 years, the detailed code generation unit 110 generates the number combination corresponding to the combination of year and month within 5 years from a point in time when a payment is requested, depending on a specific rule.

In this way, the difference of the number of cases between the conversion code and the combination of the OTP code and the variable code may be reduced. For example, in the case where the number combination of 5 years or less may be used within the expiration date, in the case where the number of 3 digits as the OTP code may be used, and in the case where the number of 9 digits as the conversion code may be used, because 60 number combinations are used as the variable code, the combination of the variable code and the OTP code may be $60 \times 10^3$. Accordingly, the difference of the number of cases at each of which only the OTP code without the variable code is used as the seed value may be reduced.

The extraction code generation unit 112 generates an extraction code used as the first code or the second code, which is used to search for the actual card number storage location in a virtual code verification means (e.g., a virtual code verification server). When the virtual code verification means uses the conversion code generated based on the OTP code as the first code, the virtual code verification means uses the extraction code as the second code. That is, the conversion code or the extraction code is used as the first code or the second code under the condition set by the virtual code verification means. The first code is to set the start point for searching for the storage location of the actual card number in the virtual code verification means; the second code is to set the search path from the start point to the storage location depending on a specific search method. In particular, the extraction code corresponds to the conversion code calculated from the OTP code generated at the same count; the virtual code verification means searches for the actual card number storage location, using the extraction code within the virtual code of a specific count and the conversion code generated based on the OTP code within the virtual code of the specific count.

Furthermore, the matching relationship between the conversion code and the extraction code and the matching relationship between the first code and the second code may be set in advance in the virtual code generation device 100 and the virtual code verification device 200 When the matching relationship between the conversion code and the extraction code and the matching relationship between the first code and the second code are applied in reverse, because the storage location of the actual card number is not found by the virtual code verification server 200, the storage location of the actual card number is set in advance at the issuance of the virtual code generation device or at the storage of the virtual code generation function.

In an embodiment, the extraction code generation unit 112 includes an extraction code generation function having the correlation with the OTP function. That is, the extraction code generation unit 112 includes the function to generate the code value capable of searching for the actual card number storage location at the same count, in the extraction code generation function while being used together with the conversion code based on the OTP code generated at the specific count.

Moreover, in another embodiment, the extraction code generation unit 112 may generate the extraction code (i.e., the extraction code having the correlation with the conversion code at the specific count) capable of searching for the actual card number storage location together with the conversion code, by entering the OTP code itself into the extraction code generation function as the seed value. Moreover, in another embodiment, the extraction code generation unit 112 may include a conversion code generation function to calculate the conversion code based on the OTP code in the same manner as the virtual code verification server 200; the extraction code generation unit 112 may generate conversion code based on the OTP code generated by the OTP code generation unit 111, may enter the conversion code as the seed value into the extraction code generation function, and may generate the extraction code.

The extraction code is generated with all or part of the number of numbers other than the fixed code and the OTP code in the total number of numbers of the virtual code. That is, the extraction code generation unit 112 may arrange all or part of the number of digits (e.g., 13 digits including the range other than the fixed code from the card identification number and the range of the card security code) other than the expiration date (e.g., 4 digits) and the fixed code (e.g., 6 digits) from the virtual code (e.g., total 23 digits in the case where a card identification number has 16 digits and the card security code has 3 digits), in the numeral string in which the extraction code and the OTP code is combined. For example, when the last digit of the card identification number is used as a check digit, the extraction code generation unit 112 may arrange the numeral string in which the extraction code and the OTP code are combined, in the remaining digits (e.g., 12 digits) other than the digit of the check digit. In particular, the virtual code generation unit 120 may combine the OTP code and the extraction code through the detailed code combining function and then may list the combined result at the digit other than the fixed code and the digit of the card security code in the card identification number.

The OTP code generation unit 111 and the extraction code generation unit 112 differently generate the OTP code and the extraction code for each unit count. That is, the OTP code and the extraction code are changed for each unit count. In this way, the virtual code generation device 100 generates a virtual code changed for each count. Even though the extraction code and the OTP code are changed for each unit count, the virtual code verification server 200 may search the actual card number storage location because the conversion code and the extraction code, which are generated based on the OTP code, are linked.

Moreover, in another embodiment, the OTP code generation unit 111 generates the OTP code of digits, which is less than the conversion code used as the first code or the second code in virtual code verification means. For example, the OTP code is generated as the number of numbers of the card security code in the actual card number; the second code is generated with all or part of the number of numbers other than the fixed code, the OTP code, and the expiration date in the total number of numbers of the virtual code. That is, when the card security code has 3 digits, the OTP code generation unit 111 generates the OTP code as a code of 3 digits; the extraction code generation unit 112 generates the extraction code with 9 digits other than the fixed code of 6 digits, the expiration date of 4 digits, the OTP code of 3 digits, and the check digit of 1 digit, in the total number of numbers the card number of 23.

In this way, because the virtual code generation device may use 9 digits in the limited digit of the actual card number as the extraction code, the number of codes capable of being used as the extraction code may increases and the security may be improved. In particular, when only the number is used in the virtual code not to modify the conventional payment process at all, the extraction code may generate 9 digits using 10 numbers from 0 to 9 and thus $10^9$ codes may be utilized.

At this time, the conversion code generated based on the OTP code may be generated as the numeral string of digits the same as the extraction code. In this way, the conversion code and the extraction code may be used by virtual code verification server as the first code or the second code, respectively. In addition, as the conversion code of greater digits is generated using the OTP code of fewer digits, lots of portions in the area (i.e., 12 digits) capable of being used for the OTP code and the extraction code in the virtual code may be used as the extraction code.

Accordingly, even when the virtual code is generated using only the number, the great number of digits is assigned to the extraction code used for the first code or the second code in the virtual code verification server 200 and the OTP code is assigned to the remaining digits, and thus the security may be improved.

The virtual code provision unit 130 may output the virtual code to the outside to provide the virtual code verification device 200 with the virtual code. The virtual code provision unit 130 may include various components capable of providing the virtual code to the outside. The virtual code provision unit 130 includes all or part of a wireless Internet module, a short range short range communication module, an IC chip 131, a magnetic field generation unit, a display unit 132, and the like.

The wireless Internet module is a module for wireless Internet access and may be embedded in a mobile terminal 100 or may be attached on the mobile terminal 100. The wireless Internet technology may include Wireless LAN (WLAN) (Wi-Fi), Wireless broadband (Wibro), World Interoperability for Microwave Access (Wimax), High Speed Downlink Packet Access (HSDPA), long term evolution (LTE), Long Term Evolution-Advanced (LTE-A), or the like. For example, in the case where the virtual code generation device 100 is a mobile terminal in which an app card application being a virtual code generation means is installed, when a user purchases an item from a shopping application or a shopping website, the virtual code generation device 100 may transmit the virtual code to a payment settlement service server (i.e., the PG server 40) through wireless Internet communication.

The short range communication module refers to a module for short range communication. The short range communication technology may include Bluetooth, Bluetooth Low Energy (BLE), Beacon, Radio Frequency Identification (RFID), Near Field Communication (NFC), Infrared Data Association (IrDA), Ultra Wideband (UWB), ZigBee, or the like.

When the virtual code generation device 100 corresponds to a card for transmitting the virtual code to a POS device, the virtual code provision unit 130 may include a magnetic field generation unit or an IC chip. The magnetic field generation unit may transmit card data to a card reader by outputting the card data in the form of a magnetic signal. The magnetic field generation unit may include one or more magnetic cells that form a magnetic field through current flow and output the magnetic signal of card information. The magnetic field generation unit may be provided such that the magnetic field generation unit is exposed on the upper or lower surface of a PCB plate along a long side to be adjacent to the specific long side of the PCB plate of the card.

The IC chip 131 may be mounted in PCB and may exchange data by contacting the terminal of IC card reader.

That is, the IC chip delivers the virtual code generated by the virtual code generation unit 120 to the IC card reader.

At this time, the display unit 132 may include at least one of a liquid crystal display, a thin film transistor-liquid crystal display, an organic light-emitting diode, a flexible display, and an E-paper.

The display unit 132 visually outputs the virtual code generated by the virtual code generation unit 120 to the outside. In this way, the user of the virtual code generation device 100 may visually identify the generated virtual code in real time and then may enter the visually identified virtual code into the virtual code verification means 20.

For example, as illustrated in FIG. 5A to 5C, when the virtual code generation device is a smart card, the virtual code generation device may include a display unit capable of outputting the virtual code without outputting the card number on the card surface. Moreover, for example, when the virtual code includes the fixed code the same as the issuer identification number, the virtual code generation device 100 may output the issuer identification number on the card surface and may store only the digits of the remaining card number in the display unit. For example, the display unit may be an E-paper, an OLED, or the like or may be a 7-segment display provided at each position. Moreover, for example, when the virtual card generation device is a smartphone in which the app card application is installed, the display unit may be the display unit of the smartphone in which the app card application is executed and is displayed.

Moreover, the user may deliver the virtual code displayed in the display unit via various paths of a text message. Because the virtual code (in particular, the code generated while being changed continuously) is delivered such that the virtual code verification means 20 searches for the actual card number without transmitting the actual card number, the user may not be concerned about the leakage of the actual card number upon transmitting the code through the text message, or the like.

Figure 6:
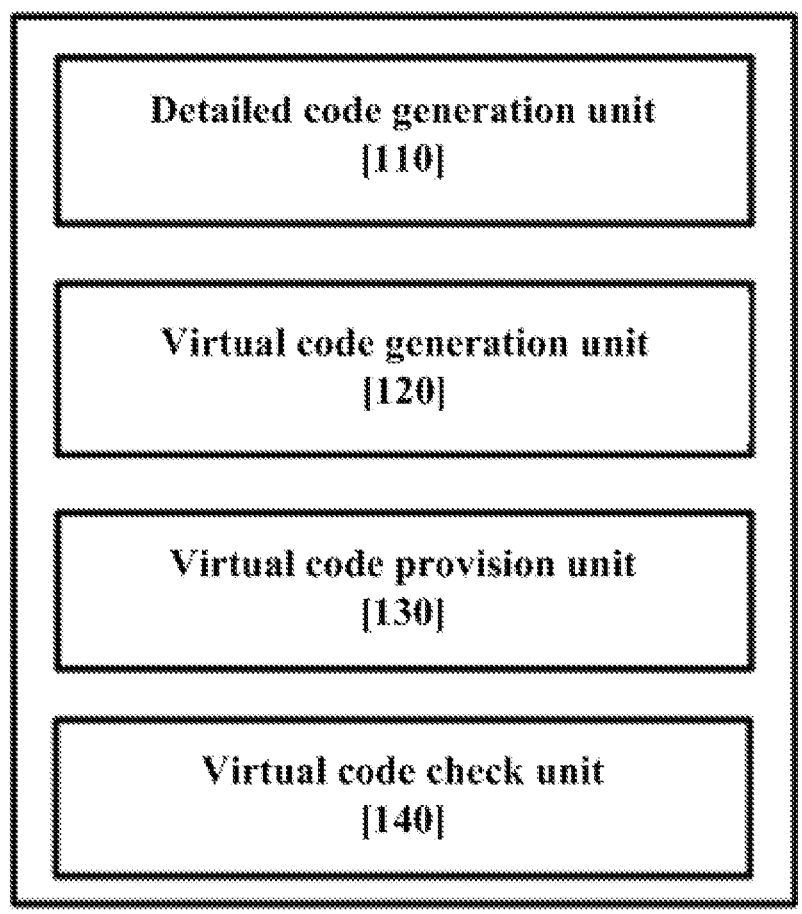
FIG. 6 is a configuration diagram of a virtual code generation device including a virtual code check unit, according to another embodiment of the inventive concept.

Moreover, in another embodiment, as illustrated in FIG. 6, the virtual code generation device 100 further includes a virtual code check unit 140. When the fixed code is used for the actual card number of a specific card type, the virtual code check unit 140 determines whether the virtual code generated at the specific count is a code string capable of being used as the actual card number in the specific card type.

When the virtual code generation unit 120 of the virtual code generation device 100 uses the issuer identification number for the virtual code of the corresponding card type, which is distinguished from the issuer identification number assigned to the actual card number of the specific card type, as the fixed code, the actual card number may not be redundant by the different issuer identification number. However, when the issuer identification number used for the actual card number is used as the fixed code, the actual card number, which has been actually issued by a card issuer or which is capable of being issued by a card issuer, may be redundant, and thus the actual card number search may be performed by identifying the virtual code by the virtual code verification server 200 to prevent the redundancy. That is, the virtual code generation device 100 needs to exclude the numeral string generated depending on the actual card number generation rule of a specific card issuer or a card type and to generate the virtual code.

In detail, the virtual code check unit 140 generates a comparison card security code by entering the card identification number, the expiration date, and the service code (i.e., the unique code used to generate the actual card number for each card issuer) in the virtual code into an actual card number generation rule; the virtual code check unit 140 compares a generation card security code, which is the number positioned at the digit of the card security code in the virtual code, with the comparison card security code; when the generation card security code is the same as the comparison card security code, the virtual code check unit 140 makes a request for again generating the virtual code. For example, the virtual code generation device 100 outputs the virtual code, which is not generated as the actual card number, by repeatedly performing the procedure of again generating the virtual code and then comparing the virtual code based on the next count. Moreover, the service code may be stored in a storage space that is not accessible from the outside.

Figure 7:
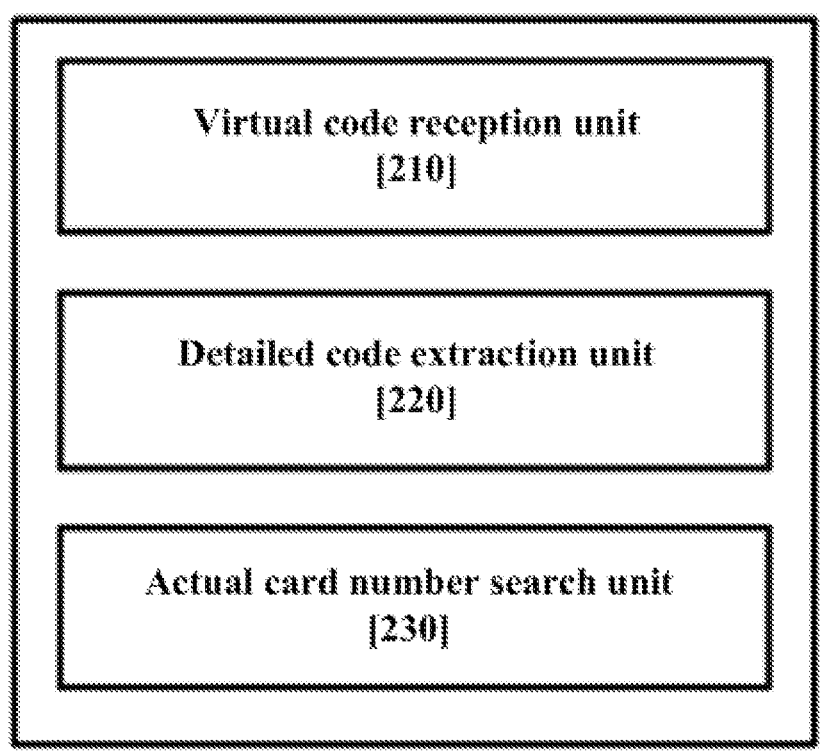
FIGS. 7 to 9 are configuration diagrams of a virtual code verification device, according to embodiments of the inventive concept.

FIG. 7 is a configuration diagram of a virtual code verification device 200, according to an embodiment of the inventive concept.

Referring to FIG. 7, according to another embodiment of the inventive concept, the virtual code verification device 200 includes a virtual code reception unit 210, a detailed code extraction unit 220, and an actual card number search unit 230. The virtual code verification device 200 may be a financial company server (e.g., the server of a card issuer or a bank).

For example, the virtual code verification device 200 may be a card issuer server that receives a virtual code for the card of a specific type of the specific card issuer had by a specific user and then searches for an actual card number to make a payment. In detail, in the case of the card payment, the virtual code verification device 200 receives the virtual code generated by the virtual code generation device 100 through a POS device and a PG server.

Furthermore, for example, when the user desires to withdraw cash from an ATM by using a smart card being a virtual code generation device, the virtual code verification device 200 may be a bank server. That is, when the user enters the virtual code into the ATM with the smart card being the virtual code generation device 100 (e.g., enter the smart card into a card slot or contact the smart card to an NFC reader), the bank server receives the virtual code from the ATM and then searches for the actual card number.

The virtual code reception unit 210 may receive the virtual code from the virtual code generation device 100. According to an embodiment, the virtual code reception unit 210 may receive the virtual code generated by the virtual code generation device 100, through the communication with another server (e.g., the payment settlement service server).

The detailed code extraction unit 220 extracts a plurality of detailed codes included in the virtual code. The virtual code may be generated by combining a plurality of detailed codes depending on the specific rule. The detailed code extraction unit 220 of the virtual code verification device 200 may include the detailed code combining function the same as the virtual code generation device 100 of a specific group, and thus the detailed code extraction unit 220 may extract a plurality of detailed codes from the virtual code by applying the detailed code combining function. For example, when the virtual code generation device 100 generates two detailed codes (e.g., the first code and the second code in the case where the first code and the second code is included in the virtual code, and the virtual code in which the OTP code and the extraction code are combined, in the case where a code capable of being used by replacing the first code and the second code is included), the detailed code extraction unit 220 may divide the two detailed codes by applying the detailed code combining function in the text array of the virtual code.

Figure 8:
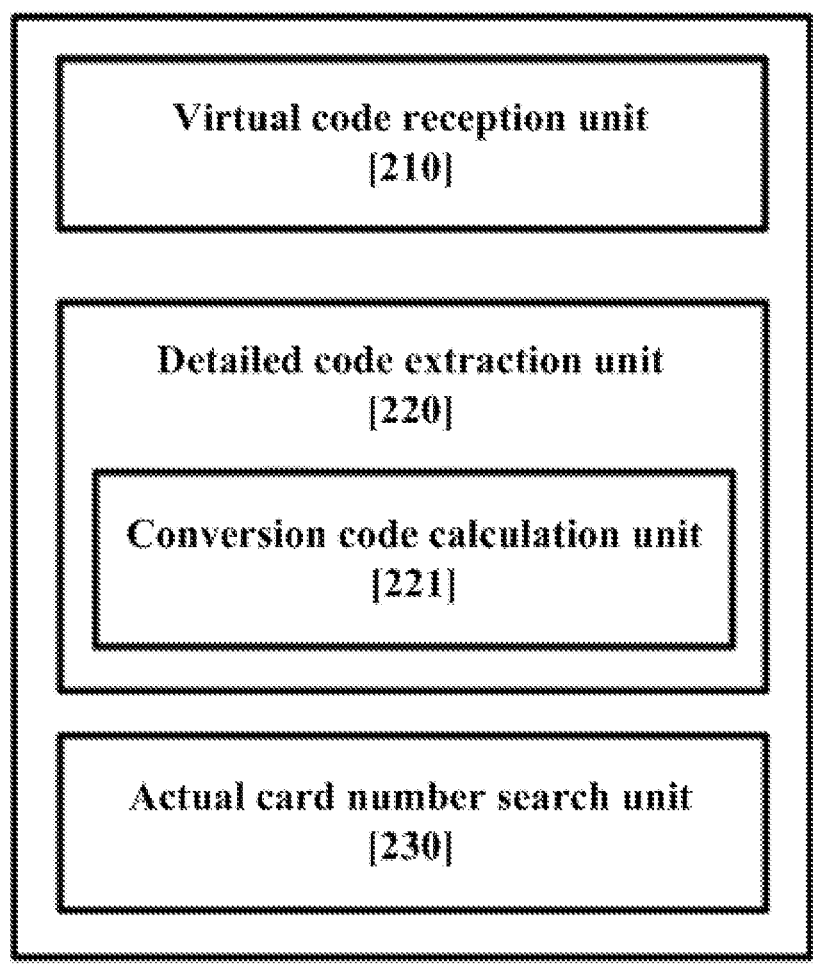

Also, in another embodiment, as illustrated in FIG. 8, the detailed code extraction unit 220 includes a conversion code calculation unit 221. When the OTP code and the extraction code are separated by the detailed code combining function because the OTP code and the extraction code are included in the virtual code, the conversion code calculation unit 221 includes a conversion code generation function to calculate the conversion code with the seed value that is the OTP code.

In an embodiment, the conversion code may be matched one-to-one with the OTP code depending on a specific rule. That is, the conversion code generation function may form a one-to-one matching relationship between the OTP code, of which digits are different, and the conversion code.

Also, in another embodiment, the conversion code is calculated by entering a count value, at which the generation of the OTP code and a virtual code is requested, into the conversion code generation function as the seed value. That is, the conversion code generation function may use the count value, at which the generation of the OTP code and the virtual code is requested, as the seed value, and thus the conversion code, which is different depending on the count value, may be generated even though the same OTP value is used as the seed value. In this way, when the OTP code is the numeral string, of which the number of digits is less than the conversion code, the conversion code, of which the number of digits is greater than the OTP code, may be used as the first code or the second code used to search for the actual card number storage location. At this time, the conversion code calculation unit 221 may compare the OTP value, which is generated at the count within a specific range from the count at which the virtual code is received, with the OTP code separated from the virtual code and then may grasp the count at which the virtual code is generated. In an embodiment, the conversion code generation function may be a specific OTP function using the OTP code as the seed data. That is, the conversion code generation function applies the OTP code to the seed data to generate the code for the current time point (i.e., the current time data).

Also, in another embodiment, when the fixed code is newly assigned to the virtual code of a specific card type, the detailed code generation unit 110 may generate the specific number combination positioned at the digit of the expiration date, as a variable code and may use both the variable code and the OTP code as the seed value (i.e., variable) of the conversion code generation function. That is, the conversion code is generated using the variable code and the OTP code as a seed value.

The number combination positioned at the digit of the expiration date is changed for each unit count and then is generated; the number combination is capable of being used as actual expiration date and is included in the maximum period from the current count. The expiration date needs to be a value within the effective period from the current time point to avoid an error in a payment system. For example, when the expiration date of the actual card is 5 years, the detailed code generation unit 110 generates the number combination corresponding to the combination of year and month within 5 years from a point in time when a payment is requested, depending on a specific rule.

The actual card number search unit 230 searches for the storage location of the actual card number based on the plurality of detailed codes. Various methods may be applied such that the actual card number search unit 230 searches for the storage location of the actual card number based on each detailed code. The actual card number search unit 230 may include the correlation between detailed codes to search for a storage location based on a plurality of detailed codes.

When the virtual code is composed of the first code and the second code, as an embodiment of having the correlation between detailed codes, the actual card number search unit 230 may determine a search start point corresponding to the first code and may search for the point, which is moved along the search path corresponding to the second code from the search start point, as the storage location of the actual card number. That is, the detailed code may include the first code for setting the start point of the storage location search and the second code for setting the search path from the start point to the storage location, depending on the specific search method.

Moreover, according to another embodiment, the virtual code generation means 10 (or the virtual code generation device 100) provides a new virtual code for each unit count, the virtual code verification device 200 may set the search start point and the search path based on the first code and the second code, which are changed for each count, to search for the storage location of the actual card number.

Furthermore, in another embodiment, for the purpose of searching for the storage location of the actual card number by using a plurality of detailed codes having the correlation, the actual card number search unit 230 may include the storage location search algorithm. The storage location search algorithm is an algorithm capable of being searching for the storage location when each detailed code included in the virtual code is applied. For example, in the case where the virtual code includes the first code for determining the search start point of the storage location and the second code for presenting the storage location direction from the search start point, when the storage location search algorithm allows a direction to be changed to the direction corresponding to the second code at the point corresponding to the first code, the storage location search algorithm is an algorithm that adjusts the storage location at which the actual card number is matched with be positioned at the corresponding location. As the storage location search algorithm is used, even though the first code and the second code included in the virtual code are changed, the virtual code verification device 200 may search for the storage location of the actual card number or the point matched with the storage location. Various methods may be applied to the storage location search algorithm, and the detailed exemplification will be described later. However, the storage location search algorithm is not limited to the exemplification described below.

Figure 9:
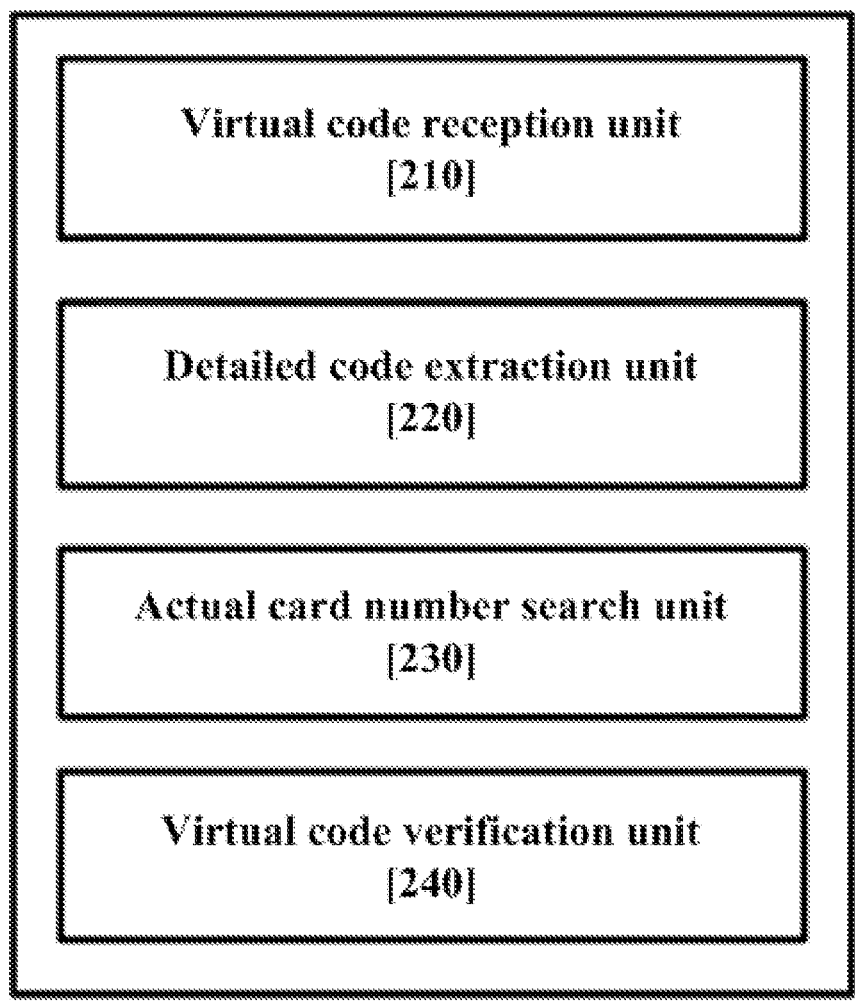

Moreover, according to another embodiment, as illustrated in FIG. 9, the virtual code verification device 200 further includes a virtual code verification unit 240. The virtual code verification unit 240 determines whether the virtual code received by the virtual code verification device 200 is authentic.

Furthermore, in another embodiment, when the virtual code includes the OTP code and the extraction code, the virtual code verification unit 240 determines whether the virtual code generated at the current time point from the card of the user by using the OTP code is correct. For example, when the OTP code is generated using the value corresponding to the count, at which the actual card number for each user or each virtual code generation means is issued or registered, as the seed data of the OTP function, the virtual code verification unit 240 compares the received OTP code included in the received virtual code with a comparison OTP code, which is generated using the count found using the conversion code generated based on the received OTP code (i.e., the received OTP code) and the extraction code extracted from the virtual code, as the seed data.

That is, the virtual code verification unit 240 determines whether the received OTP code is the same as one of a plurality of comparison OTP codes calculated based on time data within a specific time range from the current time point, using the count (i.e., the count determined as being matched with the actual card number based on a virtual code) found by the virtual code verification means, as the seed data. When the received OTP code is the same as one of the plurality of comparison OTP codes generated based on the time data within the specific time range from the current time point, the virtual code verification unit 240 may determine that the virtual code is normally generated; when the received OTP code is not the same as one of the plurality of comparison OTP, the virtual code verification unit 240 may determine that the virtual code (the virtual code generated arbitrarily or the virtual code, which has been generated previously by the corresponding virtual code generation device) is abnormally generated.

Figure 10:
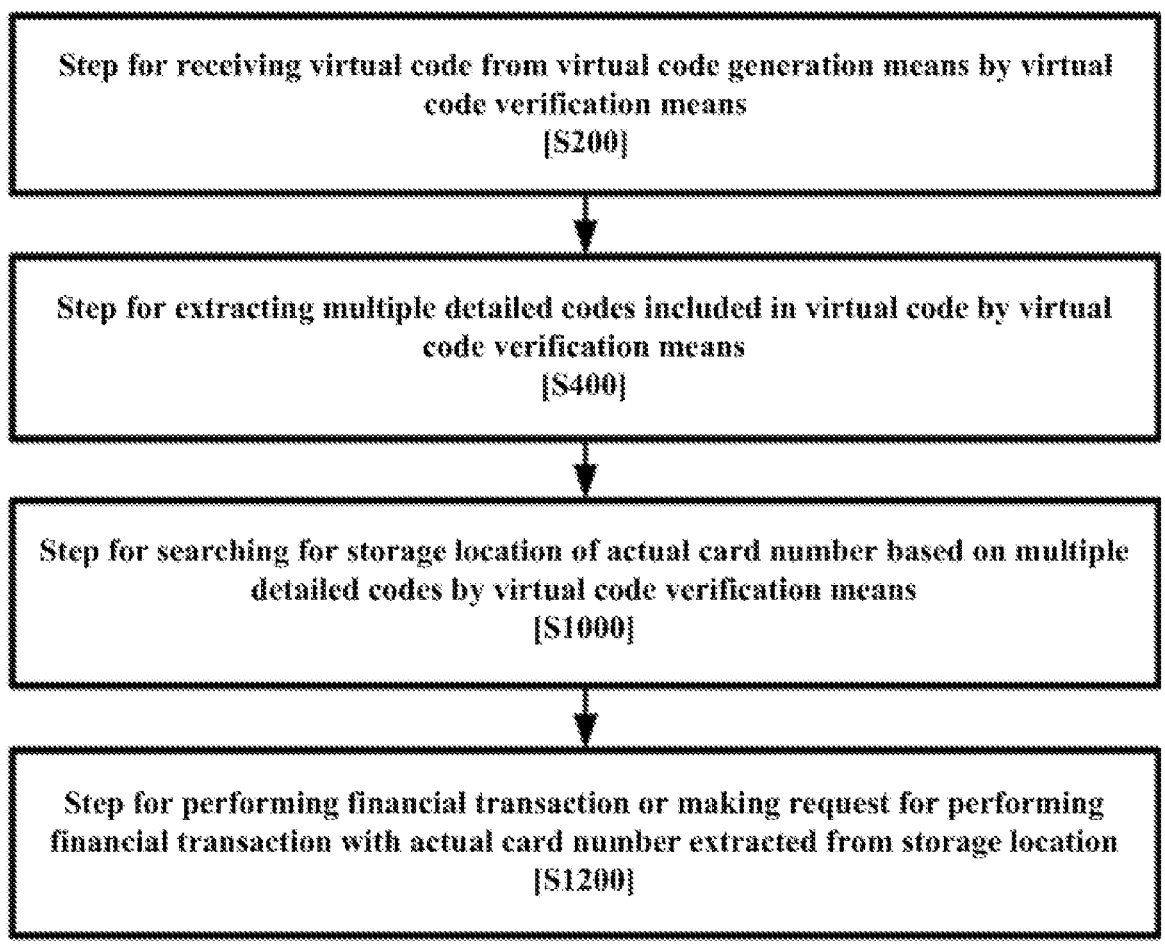
FIG. 10 is a flowchart of a virtual code-based financial transaction providing method, according to an embodiment of the inventive concept.

FIG. 10 is a flowchart of a virtual code-based financial transaction providing method, according to an embodiment of the inventive concept.

Referring to FIG. 10, a virtual code-based financial transaction providing method according to an embodiment of the inventive concept includes a step S200 (a step for receiving a virtual code) for receiving a virtual code provided by a virtual code generation means, by a virtual code verification means, a step S400 for extracting multiple detailed codes included in the virtual code by the virtual code verification means, a step S1000 for searching for a storage location of an actual card number on the basis of the multiple detailed codes by the virtual code verification means (a step for searching for the actual card number), and a step S1200 for performing a financial transaction or for making a request for performing a financial transaction with the actual card number extracted from the storage location. Hereinafter, the detailed description of each operation is provided. However, the detailed disclosure of the content described in the description process associated with the virtual code generation device 100 and the virtual code verification device 200 is omitted.

In operation S200, the virtual code verification means 20 receives the virtual code from the virtual code generation means 10 (a step of receiving a virtual code). The virtual code is generated by the virtual code generation device 100 or the virtual code generation means 10 and then is provided to the virtual code verification means 20.

The virtual code verification means 20 receives the virtual code generated by the virtual code generation means 10 in various manners. That is, various virtual code providing methods of the above-described virtual code generation device 100 described above may be applied.

For example, when a card issuer server includes the virtual code verification means, the step S200 for receiving the virtual code includes receiving, by the virtual code verification means, the virtual code classified to correspond to a specific card issuer based on the fixed code in a payment settlement service server. At this time, the payment settlement service server receives the virtual code from the payment program driven by the financial transaction terminal 30 or a computer.

In S400, the virtual code verification means 20 extracts a plurality of detailed codes included in the virtual code. When the virtual code verification means 20 includes the virtual code generation function including the virtual code generation means 10, the virtual code verification means 20 extracts a plurality of detailed codes by identically applying the rule (i.e., the detailed code combining function) for combining a plurality of detailed codes. That is, the detailed code combining function corresponds to the rule for arranging a plurality of detailed codes; the detailed code combining function is included in the virtual code generation function.

In an embodiment, when the first code and the second code, which are used to search for the storage location, are directly included in the virtual code, the virtual code verification means 20 extracts the first code and the second code, using the detailed code combining function. That is, each of the first code and the second code may be used for the virtual code verification means 20 to search for the location of the actual card number. For example, the first code may be a code for setting the start point of the storage location search of the actual card number in the virtual code verification means 20; the second code may be a code for setting the search path from the start point to the storage location in the specific search manner The search method may be determined by a storage location search algorithm. The detailed description about the determination of the search method will be given in detail in the step S1000 for searching for the actual card number to be described later.

Moreover, according to another embodiment, when the virtual code generation function generates the first code or the second code of N digits using 'M' characters, the virtual code generation function includes a first function or a second function that provides $M^N$ different codes as the first code or the second code that is sequentially changed for each unit count. That is, the first function or the second function is a function that generates $M^N$ codes without duplication as the count increases; the first function or the second function generates specific one among $M^N$ codes at the count corresponding to the specific time point as the first code or the second code. In this way, the virtual code generation means 10 may not redundantly generate the same first code or second code within $M^N$ counts (i.e., the time length corresponding to $M^N$ counts) but generate a new detailed code (i.e., the first code or the second code) for each unit count to generate the new virtual code for each unit count.

In particular, when the virtual code generation function generates the first code or the second code of N digits using M characters, in the case where the virtual code generation function may use $M^N$ codes as the first code or the second code, the virtual code generation function may match each code for each count from the initial time point at which the detailed code generation function is operated. For example, when setting the unit count to one second, the detailed code generation function matches $M^N$ different codes every second from the first driven time point. Moreover, when the period of using the specific detailed code generation function or the usage period (e.g., the expiration date of a smart card generating the virtual code) of the virtual code generation device 100 is set to be shorter than the time length (e.g., $M^N$ seconds in the case where 1 count is 1 second) corresponding to $M^N$ count, the first code or the second code is not redundantly generated during the usage period. That is, when the count increases with time, in the case where a user requests the virtual code generation means 10 to generate a virtual code at a specific time point, the virtual code generation device 100 may generate a code value matched with a count corresponding to a specific time point, as the first code or the second code.

Moreover, according to another embodiment, at least one of the first code or the second code included in the virtual code may be generated by reflecting a value (i.e., device identification value) that is always differently present at the same time point in each of the virtual code generation means 10 such that the same virtual code is not generated at the same time point even within the same group (i.e., the same card type group of the same card issuer). That is, when the issuance of the virtual code is requested by the plurality of virtual code generation means 10, which is the same card type or card kind at a specific time point, the first code or the second code is differently generated by reflecting a value differently assigned to each of the virtual code generation means 10 at each time point such that each of the virtual code generation means 10 generates different virtual codes.

For example, when the virtual code includes the fixed code corresponding to an issuer identification code, the virtual code verification device 200 (e.g., a card issuer server) assigns a virtual code generation function for each card type of each card issuer distinguished by an issuer identification number. Accordingly, because different virtual codes are generated between different card issuers/card types by the fixed code, the virtual code generation means 10 needs to generate the detailed code such that the same virtual code is not generated within a specific card type group of the same card issuer. To this end, the detailed code is generated by reflecting the value differently assigned to each of the virtual code generation means 10 at each time point such that each of the virtual code generation means 10 generates different virtual codes.

For example, the device identification value may be the elapsed time (or the number of counts) from the start time point (e.g., the time point at which a specific empty card is registered in the specific virtual code generation device 200 and the detailed code generation function starts to be applied, after a specific time elapses from the first time point at which the specific detailed code generation function is driven in the server 20), at which the specific virtual code generation means 10 is included in a group to which the specific detailed code generation function is applied, to the present. For example, the device identification value is used as the time elapsing from a count at which the actual card number belongs to the corresponding card type group after the actual card number is issued in the card type of a specific card issuer at the request of a specific user. For example, when the virtual code is generated from the combination of the first code and the second code, the virtual code generation function may generate the second code based on the unit count elapsing from a time point when the actual card number is newly generated.

Even when the issuance of the virtual code is requested within a plurality of virtual code generation means at the same time, the different codes needs to be generated to solve the problem of the redundant code. When the counts for setting the virtual code generation means 10 to belong to the corresponding card type group are not the same as one another (e.g., when the actual card number for the virtual code generation means 10 is not capable of being registered in the corresponding card type group at the same time point), the time elapsing from a time point (or count), when the virtual code generation means 10 belongs to the group, to a specific time point may be different for each of the virtual code generation devices 100. For example, when the request for the card issuance of a specific card type of a specific card issuer is received simultaneously, the virtual code verification means 20 may process the card issuance request received at the same time as the request coming at a different count by assigning the order depending on the predetermined condition. That is, the virtual code verification means 20 may match the actually simultaneously received card issuance request to a different count such that the difference of at least one unit count occurs and may allow the number of counts elapsing from a time point, when the actual card number for each of the virtual code generation means 10 is issued, to the specific same time point so as to be always different.

Accordingly, at least one of the detailed code generating functions may allow the virtual codes generated by each of the virtual code generation devices 100 to be always different for each time point, using the time elapsing from the time point (or count), at which the virtual code generation devices 100 belong to the specific card type group, to a specific time point as a device identification value. As such, the virtual code verification means 20 may distinguish the virtual code generation means 10 only by receiving the virtual code without separately receiving the data for distinguishing the user.

Moreover, because the time length elapsing from the time point, at which a specific virtual code generation device 100 belongs to a specific card type group, continuously increases with time, the detailed code (e.g., the second code) generated by the specific virtual code generation device 100 is not generated as the same value but is continuously generated as a different value.

Furthermore, according to still another embodiment, the first code may be set as a code value corresponding to a time point (or count) at which the generation of a virtual code is requested, among codes matched for each count from an initial time point at which the first function is driven, the second code may be set as a code value generated by reflecting a value (i.e., a device identification value) that always differently exists at the same time point for each of the virtual code generation devices 100, and the virtual code may be used as a code value obtained by combining the first code and the second code, such that a redundant virtual code is not generated in the whole period regardless of the user. Because the first code has a different code value for each count and the second code has a different code value for each of the virtual code generation devices 100 at the same time point, the virtual code obtained by combining the first code and the second code may be output as a different code value for all of the virtual code generation devices 100 at all points in time.

Moreover, according to another embodiment, the virtual code generation function includes a detailed code combining function corresponding to a rule for arranging a plurality of detailed codes. That is, the virtual code generation function may have a specific rule that lists or places the characters included in a plurality of detailed codes. Accordingly, in the case of the virtual code generation means 10 and the virtual code verification means 20 including the same virtual code generation function, the virtual code generation means 10 may arrange the characters included in a plurality of detailed codes, depending on the detailed code combining function and the virtual code verification means 20 may separate a respective detailed code from the virtual code, using the same detailed code combining function.

Furthermore, in another embodiment, one of a plurality of listing rules that lists M characters in ascending order may be applied to the virtual code generation function. That is, various listing rules that list the M characters in ascending order may be applied to the virtual code generation function; the virtual code generation function may be classified into different virtual code generation functions depending on the applied listing rules.

In another embodiment, the virtual code verification means 20 includes a plurality of detailed codes used by replacing the first code and the second code, which are used to search for the storage location within the virtual code, the virtual code verification means 20 extracts the plurality of detailed codes by using the detailed code combining function and then converts the extracted result into the first code and the second code, which are used to search for the actual card number storage location.

In detail, the step S400 for extracting the detailed code includes extracting, by the virtual code verification means, the fixed code and a plurality of detailed codes, which are included in the virtual code depending on a specific rule, when a plurality of detailed codes include the OTP code and the extraction code. The OTP code is generated with the specific number of numeric arrays based on the OTP function in the virtual code generation means 10 and is used to calculate the conversion code. The extraction code corresponds to the first code calculated from OTP code and is generated with all or part of the number of numbers other than the fixed code and the OTP code in the total number of numbers of the virtual code.

Figure 11:
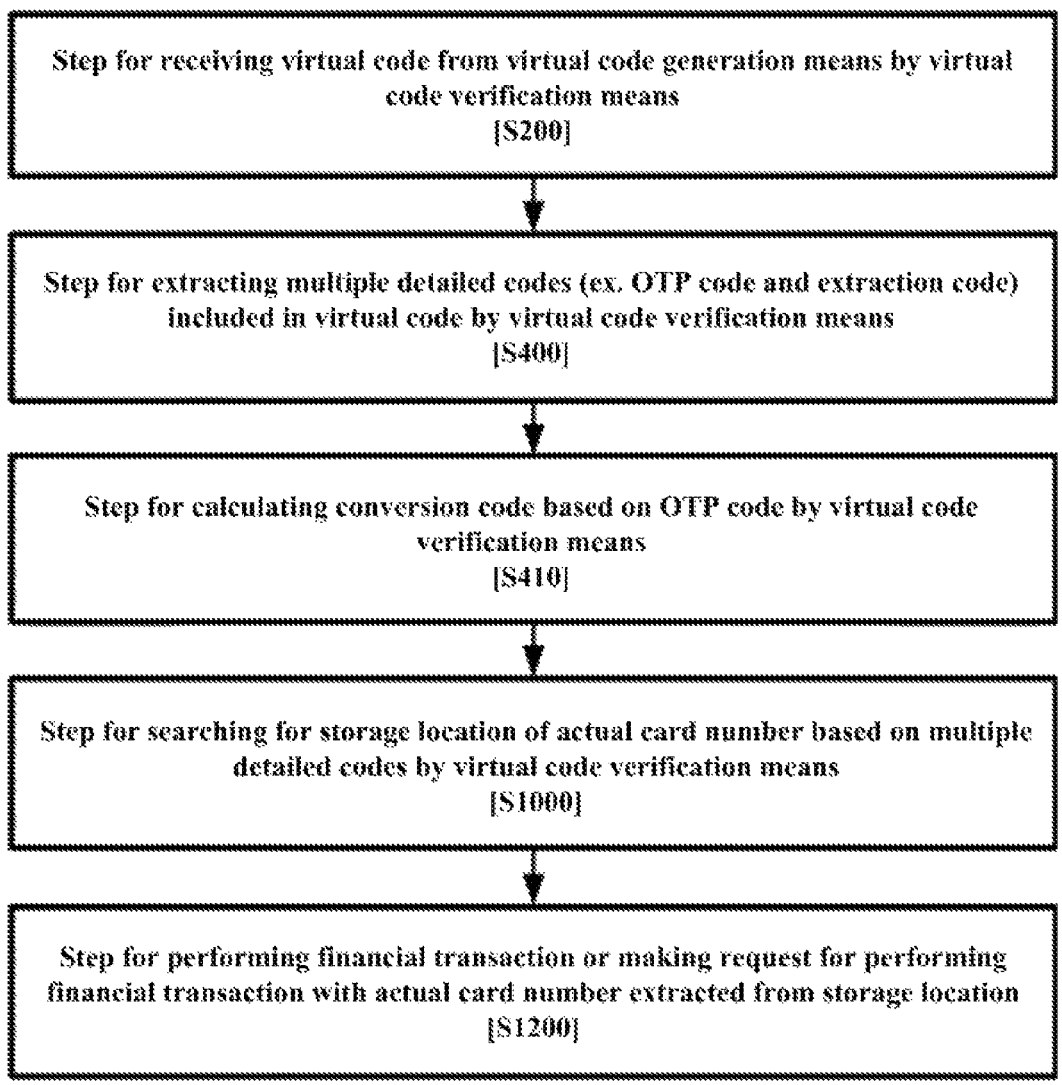
FIG. 11 is a flowchart of a virtual code-based financial transaction providing method further including a step for calculating a conversion code, according to an embodiment of the inventive concept.

Also, the step S400 for extracting the detailed code, as illustrated in FIG. 11, further includes a step S410 of calculating, by the virtual code verification means, the conversion code based on the OTP code. That is, the OTP code may be directly used as the first code or the second code; the OTP code needs to be converted as the conversion code capable of being used as the first code or the second code.

For example, when the combination of the OTP code and the extraction code is arranged in the number of digits other than the digit of the fixed code (i.e., an issuer identification number) and the digit of the verification number within the card identification number and the number of digits of the card security code and when the detailed code is generated using only the number, the virtual card generation means 10 may allocate lots of digits in the extraction code and may allocate fewer digits in the OTP code, to increase the number of available codes of the extraction code directly used to be converted to the first code or the second code. Accordingly, the OTP code needs to be converted into the conversion code that is a code of the same number of digits as the extraction code.

To this end, the virtual code verification means 20 includes a conversion code generation function to generate the conversion code, using the OTP code as the seed value. The virtual code verification means 20 includes the conversion code generation function the same as the virtual code generation means 10.

In an embodiment, the conversion code generation function may match the conversion code with the OTP code, of which the number of digits is different, one-to-one depending on the specific rule, using only the OTP code as the seed value.

Also, in another embodiment, the conversion code generation function may calculate the conversion code, using the count, at which the OTP code and the virtual code are generated, as the seed value. At this time, the virtual code verification means may identify the count at which the virtual code is generated by comparing the OTP value generated using the OTP code generation function at a count within a specific range from a count at which the virtual code is received with the OTP code. That is, the virtual code verification means 20 may calculate a count value at which the virtual code is generated by comparing the comparison code, which is generated by the same OTP function the same as that included in the virtual code generation means, with the OTP code and may enter the count value and the OTP code as the seed value into the conversion code generation function at a step for S410 of calculating the conversion code to calculate the conversion code.

Furthermore, in another embodiment, the virtual code verification means may generate the conversion code, using the variable code being the number combination included in the digit of the expiration date together with the OTP code as the seed value. That is, when the fixed code is the code newly assigned to the virtual code of a specific card type, not the conventional issuer identification number assigned to the actual card number, the step S400 of extracting the detailed code includes extracting a variable code from the digit of the expiration date and entering the variable code and the OTP code into the conversion code generation function as the seed value to generate the conversion code in S410 (a step of calculating the conversion code).

The variable code is to assign the effectively available number combination with the expiration date based on the payment request time point in the virtual code generation means 10. The virtual code generation means 10 generates the extraction code so as to have the correlation with the conversion code generated using the combination of the variable code and the OTP code. In this way, the virtual code verification means may generate the conversion code by entering the variable code at the digit of the expiration date within the virtual code the OTP code extracted from the virtual code, into the conversion code generation function as the seed value and may immediately use the conversion code as a code (i.e., the first code in the case where the extraction code is used as the second code) different from the extraction code.

Moreover, according to another embodiment, when the virtual code includes the fixed code for determining the group for including the virtual code generation means 10, the step S400 for extracting the detailed code may extract the fixed code from the virtual code, may determine the card type group of the virtual code generation means based on the fixed code, and may determine the virtual code generation function or the storage location search algorithm for the card type group. That is, when differently applying the virtual code generation function or storage location search algorithm for each group, the virtual code verification means 20 distinguishes a group based on the fixed code in the virtual code.

Moreover, a procedure of determining the virtual code generation function using the fixed code may be performed before a procedure of extracting a plurality of detailed codes. When the virtual code generation function is determined by the fixed code, the detailed code combining function included in the virtual code generation function is determined to extract a plurality of detailed codes. To this end, the fixed code may be combined at a fixed location (e.g., the specific number of digits in front of the virtual code) within the virtual code such that the virtual code verification means 20 is capable of being easily separated without a separate function.

In the detailed embodiment, the step S400 of extracting the detailed code includes extracting the fixed code from the card identification number area in the virtual code, setting the detailed code combining function corresponding to a specific card type based on the fixed code, and extracting the OTP code and the extraction code from the numeral string listed at the digit other than the fixed code and the digit of the card security code in the card identification number, using the detailed code combining function, when the result obtained by combining the OTP code and the extraction code is included in all or part of the numeral string listed at the digit other than the fixed code in the card identification number within the virtual code and the digit of the card security code.

Furthermore, in another embodiment, the virtual code verification means may use the expiration date value as the detailed reference value of the lower fixed code for distinguishing the storage location search algorithm or the virtual code generation function. That is, the virtual code identically includes the expiration date of an actual card number; the virtual code verification means 20 includes the actual card number search algorithm different depending on the values of the fixed code and the expiration date. As described later, the actual card number search algorithm searches for the location at which the actual card number is stored, based on the first code and the second code. In this way, because the actual card number search algorithm is separately used depending on expiration date value (i.e., depending on a month or a year when the card of the specific type is issued) within a single card type, the virtual code verification means 20 may redundantly use a plurality of groups obtained by dividing the combination of the available extraction code and the available OTP code by the value of the fixed code and the expiration date.

In S1000, the virtual code verification means 20 searches for the storage location of the actual card number based on a plurality of detailed codes (a step for searching for the actual card number). When a plurality of detailed codes are the first code and the second code, the virtual code verification means 20 performs the actual card number storage location search, using the first code and the second code extracted from the virtual code. The first code and the second code have the correlation between each other; the virtual code verification means 20 searches for the storage location of the actual card number based on the correlation between the first code and the second code. In the detailed embodiment, the first code is to set the start point for searching for the storage location of the actual card number in the virtual code verification means; the second code is to set the search path from the start point to the storage location depending on a specific search method.

In another embodiment, when the detailed code within the virtual code is a code (e.g., the OTP code and the extraction code) used to be converted to the first code and the second code, the virtual code verification means 20 may apply the conversion code and the extraction code, which are calculated by the OTP code, to the first code and the second code as the reference the same as the virtual code generation means 10. For example, the virtual code generation means 10 and the virtual code verification means 20 may determine to identically use the extraction code as the second code and to identically use the conversion code, which is generated based on the OTP code, as the first code. Accordingly, the virtual code verification means 20 may apply the conversion code and the extraction code to the first code and the second code depending on the determined reference, respectively.

In a plurality of detailed codes within the virtual code, the code generated for each unit count may be changed (e.g., when the virtual code is composed of two detailed codes, the OTP code and the extraction code are changed for each unit count); even though the virtual code is changed for each unit count, the virtual code verification means 20 may search for the actual card number storage location as the first code and the second code corresponding to a plurality of detailed codes have the correlation.

According to an embodiment associated with the correlation between the detailed codes constituting the virtual code, when the virtual code is made through the combination of the first code and the second code, the virtual code verification means 20 may set the first code to the search start point (i.e., the point for starting the search of the storage location of the actual card number) and may apply the second code to the path for moving from the search start point to the storage location to search for the storage location. That is, when the normally generated virtual code is received for each unit count, the virtual code verification means 20 determines that the search point moving along the search path corresponding to the second code from the start point corresponding to the first code is the point (e.g., storage space matched with the search point in a separate server) matched with the storage location of the actual card number or the storage location.

According to an embodiment, when the second code includes information about the path from the search start point corresponding to the first code to the storage location, the virtual code verification means 20 may search for the point matched with the storage location of the actual card number or the storage location along the search path corresponding to the second code from the search start point corresponding to the first code.

According to another embodiment, the virtual code verification means 20 may include a storage location search algorithm for adjusting the storage location of the actual card number so as to be matched with the virtual code for each unit count. That is, the virtual code verification means 20 includes the storage location search algorithm adjusting the search path to the point matched with the storage location of the actual card number for each unit count. When the first code and the second code are changed for each unit count, the virtual code verification means 20 may adjust the storage location search algorithm to be matched with the changed first code and the changed second code. The storage location search algorithm may be implemented in various forms.

Figure 13:
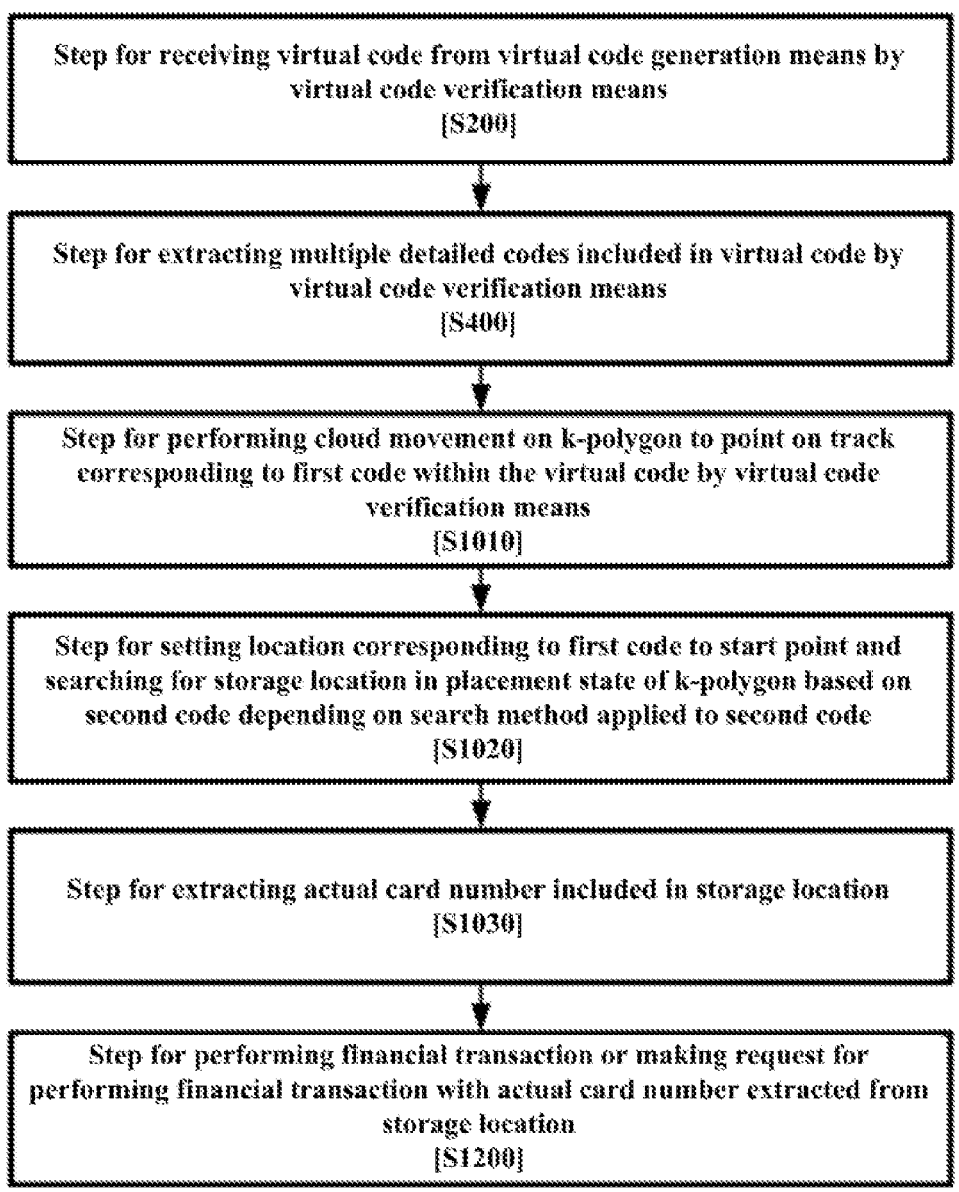
FIG. 13 is a flowchart of a virtual code-based financial transaction providing method including a procedure of searching for an actual card number according to k-polygon cloud movement, according to an embodiment of the inventive concept.

According to an embodiment, as illustrated in FIG. 13, the storage location search algorithm is to perform cloud movement on the k-polygon while the vertex of the k-polygon corresponds to the point at which each code is positioned on a track on which 'k' ('k' is $M^N$) codes are listed. At this time, the step S1000 for searching for the actual card number includes a step S1010 for performing, by the virtual code verification means 20, cloud movement on the k-polygon to the point on the track corresponding to the first code within the virtual code received from the virtual code generation means 10, a step S1020 (a step for searching for a storage location) for setting the location corresponding to the first code to the start point and searching for the storage location in the placement state of the k-polygon or the point matched with the storage location based on the second code depending on the search method applied to the second code, and the step S1030 for extracting the actual card number included in the storage location.

Figure 12:
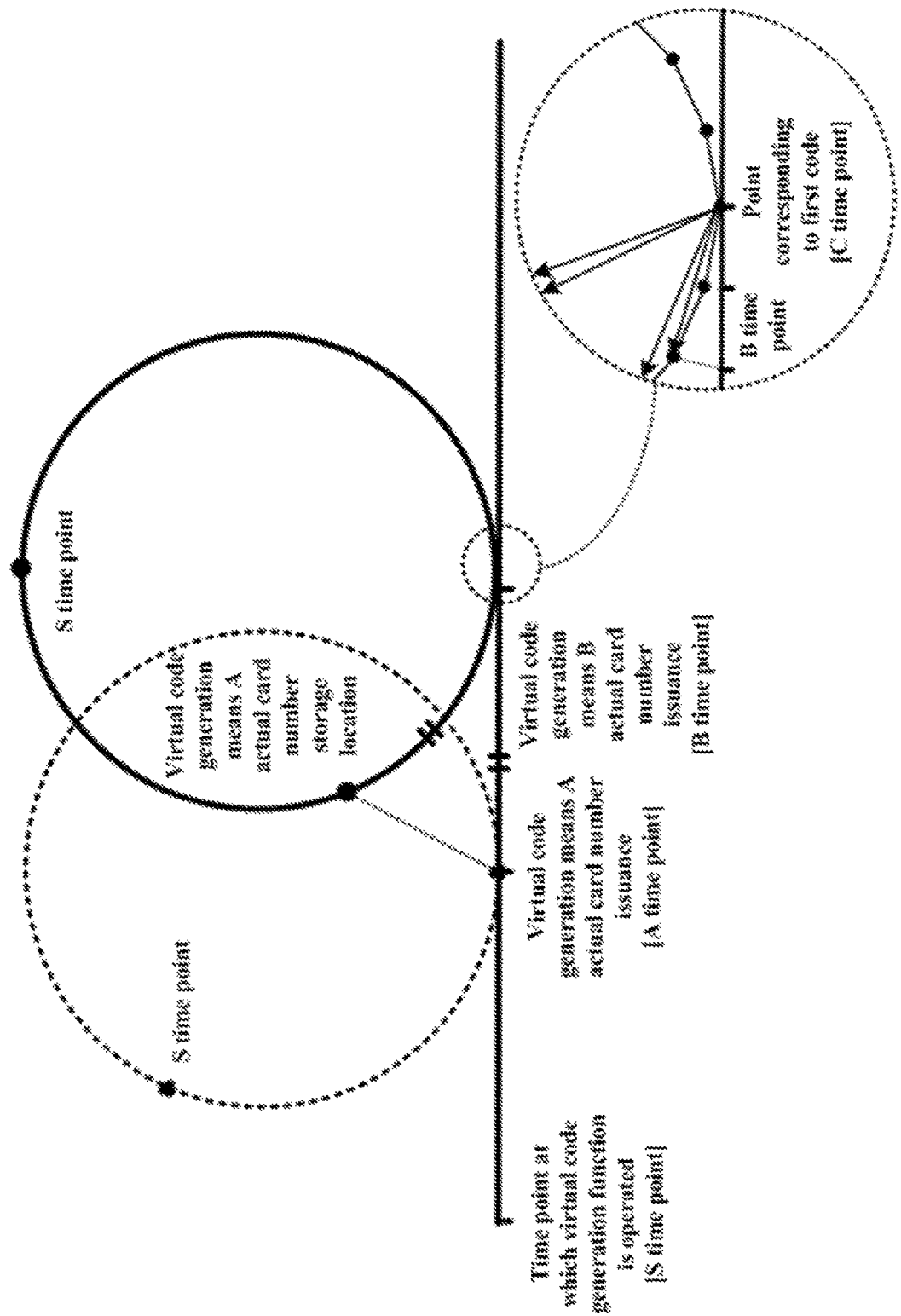
FIG. 12 is an exemplary view of a storage location search algorithm searching for a storage location of an actual card number through cloud movement of a k-polygon, according to an embodiment of the inventive concept.

As illustrated in FIG. 12, in S1010, the virtual code verification means 20 performs cloud movement on the k-polygon to the point on the track corresponding to the first code within the virtual code received from the virtual code generation means 10. The storage location search algorithm is the k-polygon ('k' is $M^N$) on which the cloud movement is performed along the track on which $M^N$ codes corresponding to the first code are listed; the vertex of the k-polygon moves while corresponding to the point at which a code is positioned on a first code track. At this time, the virtual code verification means 20 may apply the k-polygon to the cloud movement such that the vertex of the k-polygon is in contact with the point corresponding to the first code.

As illustrated in FIG. 12, in S1020, the virtual code verification means 20 sets the location corresponding to the first code to the start point and searches for the point (i.e., the specific vertex of a k-polygon) matched with the storage location or storage location in the placement state of the k-polygon, based on the second code in the search manner applied to the second code (a step for searching for the storage location). The storage location is matched with each vertex of the k-polygon. The point at which the first code track (i.e., a first track) corresponds to the k-polygon is the start point of the storage location search corresponding to the first code. The virtual code verification means 20 searches for the matching point of the storage location, at the search start point based on the second code.

Various methods may be applied to the method of searching for a storage location in the k-polygon based on the second code. In this way, the virtual code verification means 20 allows an angle to be changed from the location on the first track, which the k-polygon is contact with, to an angle (e.g., a specific angle obtained by dividing 180 degrees into $M^N$ pieces so as to face the vertex of the k-polygon) corresponding to a second code, the virtual code verification means 20 may search for the vertex of the k-polygon that is a storage location at which the actual card number corresponding to the virtual code is stored.

Furthermore, for another example, in a state where the k-polygon is in contact with the point corresponding to the first code on the first track, the virtual code verification means 20 divides the whole central angle (i.e., 360 degrees) into $M^N$ pieces based on the center of the k-polygon and the contact point on the first track, and matches each angle to $M^N$ second codes. At this time, the direction of the line moving by unit angles (i.e., 360 degrees/$M^N$) of specific numbers from the line connecting the center of the k-polygon to the contact point on the first track faces the specific vertex of the k-polygon. Accordingly, when the second code corresponding to the specific angle is received, the virtual code verification means 20 may search for the vertex positioned in the corresponding angle direction.

Furthermore, for another example, the specific digit of the second code may be used to determine an angle calculation direction. That is, when the second code is generated using 'N' ('N' is a natural number) characters, the angle measurement direction may be determined with one digit. For example, when the virtual code verification means 20 divides the whole central angle (i.e., 360 degrees) into $M^N$ pieces based on the center of the k-polygon and the contact point on the first track and matches the second code to each angle, the virtual code verification means 20 may determine whether the angle is an angle measured to the right from the line connecting the center of the k-polygon to the contact point on the first track or whether the angle is an angle measured to the left.

For example, the storage location search algorithm may assign two second codes different from each other depending on the angle measurement direction at each vertex on the k-polygon, to one vertex. That is, the second codes different from each other in the arrival with the interior angle and the arrival with the exterior angle may be matched with the one vertex and may be connected to the actual card number. For another example, when the second code is generated using 'N' ('N' is a natural number) characters, the storage location search algorithm may match (N−1) characters with half of the total angle (e.g., 360 degrees in the case where the total angle is divided based on the center angle) and may determine the angle application direction for reaching each vertex, using one digit.

The method of searching for a storage location in the k-polygon based on the second code is not limited thereto; various methods such as the method of searching for a point for dividing space between the point on the k-polygon corresponding to the second code and the contact point on the first track at a specific ratio, as the storage location may be applied.

Afterward, in S1030, the virtual code verification means 20 extracts the actual card number included in the storage location. That is, the virtual code verification means 20 searches for the storage location corresponding to the vertex of the k-polygon and then extracts the actual card number in the storage location.

Moreover, according to another embodiment, the storage location search algorithm is moving to the point matched with the storage location of the actual card number on the track based on a plurality of detailed codes constituting the virtual code. For example, the point matched with the storage location of the actual card number may be a point on the track corresponding to the count (i.e., a time point) at which the actual card number is issued in the virtual code generation means.

In particular, when the virtual code includes the first code generated based on the time elapsing from a time point when a virtual code generation function is operated and the second code generated based on the time elapsing from a time point when the actual card number is issued in a specific virtual code generation means, as illustrated in FIG. 10, the virtual code verification means 20 may set the count on the track matched with the code value corresponding to the first code to a search start point and may search for the point (i.e., the point matched with the storage location of the actual card number) on the track at the time point when the actual card number is issued in the virtual code generation means 10 by returning along a track from the search start point by the count value calculated when the inverse function of the second function (or an extraction code generation function in the case where the extraction code is used as the second code) is applied to the second code.

Furthermore, as the detailed example, the virtual code verification means 20 may position the moving track (i.e., a second moving track) for the second code disposed in parallel with a moving track (i.e., a first moving track) for the first code in a direction opposite to the movement direction according to the first code, with respect to the search start point moved by the first code. In addition, the virtual code verification means 20 may move to the location of the code value corresponding to the second code on the second moving track and may search for the point on the first moving track corresponding to the location as the actual card number storage location.

Afterward, in S1200, the virtual code verification means 20 performs a financial transaction progress or a financial transaction progress request, using the actual card number extracted from the storage location.

Figure 15:
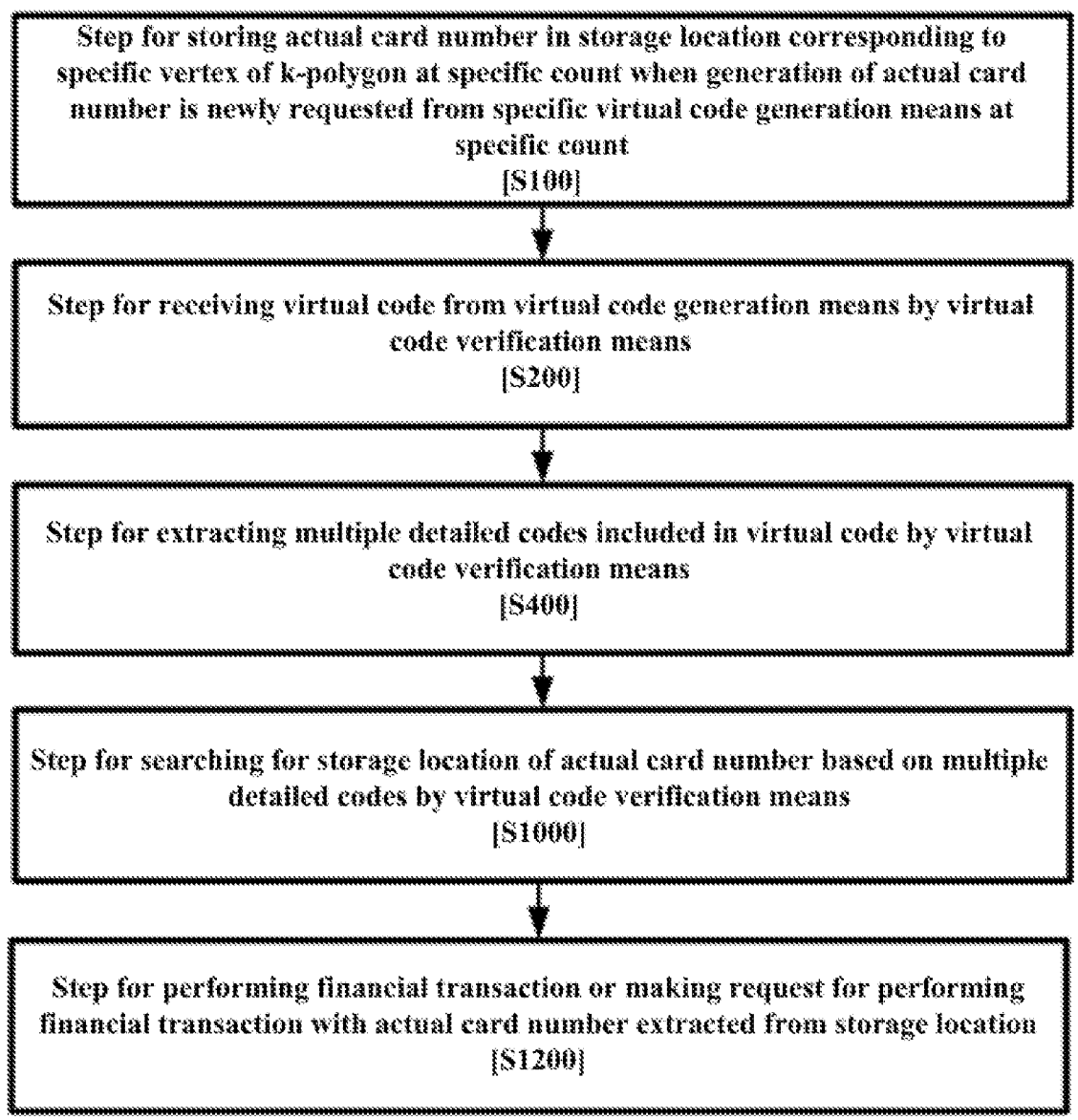
FIG. 15 is a flowchart of a virtual code-based financial transaction providing method further including a procedure of issuing an actual card number and then storing the actual card number in a storage location, according to an embodiment of the inventive concept.

Moreover, as illustrated in FIG. 15, according to another embodiment, when the specific virtual code generation means 10 makes a request for generating the actual card number at a specific count, a step S100 (a step for storing the actual card number) for storing the actual card number in the storage location corresponding to the specific vertex of the k-polygon at the specific count may be further included. The specific vertex contacts the specific count on the track. When a specific time point (or count) elapses after the virtual code verification means 20 drives the virtual code generation function and the storage location search algorithm, the virtual code verification means 20 may store the newly generated actual card number in the storage location matched with the vertex of the k-polygon contacting the first track as the issuance of a new actual card number for the specific virtual code generation means 10 is received. In particular, the cloud movement is performed on the k-polygon such that the location at which the k-polygon contacts the track is moved for each code for each count as the virtual code generation function and the storage location search algorithm are operated in the virtual code verification means 20; when the issuance of the new actual card number is requested at a specific count, the vertex contacting the track at a specific count is determined as the point on the k-polygon at which the actual card number is stored.

For example, as illustrated in FIG. 12, the virtual code verification means issues the actual card number at 'A' time point with respect to the virtual code generation means A, and then stores the actual card number of the virtual code generation means A in the vertex of the k-polygon contacting the track at 'A' time point. Afterward, as the count elapses, the cloud movement is performed on the k-polygon along the track. The storage location at which the actual card number of the virtual code generation means A is stored may be rotation by the rotation of the k-polygon.

That is, after the actual card number is stored in the vertex of the k-polygon contacting the track, the point at which the actual card number is stored by 'n' counts is rotated by rotating the k-polygon by 'n' counts. Accordingly, when the second code is calculated by reflecting the number of unit counts elapsing from a count (i.e., time point) at which the actual card number is issued, the virtual code verification means 20 may calculate the point on the k-polygon at which the actual card number is stored at a time point when the virtual code is generated, through the second code.

In particular, when the first code is a code value corresponding to the number of counts elapsing from the first time point at which the specific virtual code generation function and the storage location search algorithm are operated within the virtual code verification means 20 and when the second code is a code value corresponding to the number of counts elapsing after the actual card number is issued with respect to the specific virtual code generation means 10, the virtual code verification means 20 may grasp the time point (e.g., 'C' time point), at which the virtual code generation means 10 makes a request for the virtual code generation, through the first code and may grasp the vertex of the k-polygon at which the actual card number is stored, in the k-polygon placement state of the corresponding time point through the second code. That is, the first code is used to determine the point on the track that results in the k-polygon placement state capable of searching for the specific vertex of the k-polygon; the second code is used to search for the vertex on the k-polygon matched with the storage location of the actual card number after the k-polygon is positioned at the point on the track corresponding to the first code. In this way, even though there is a delay time to provide the virtual code to the virtual code verification means 20 after the virtual code generation means 10 generates the virtual code, the virtual code verification means 20 may accurately search for the actual card number corresponding to the virtual code.

Figure 14:
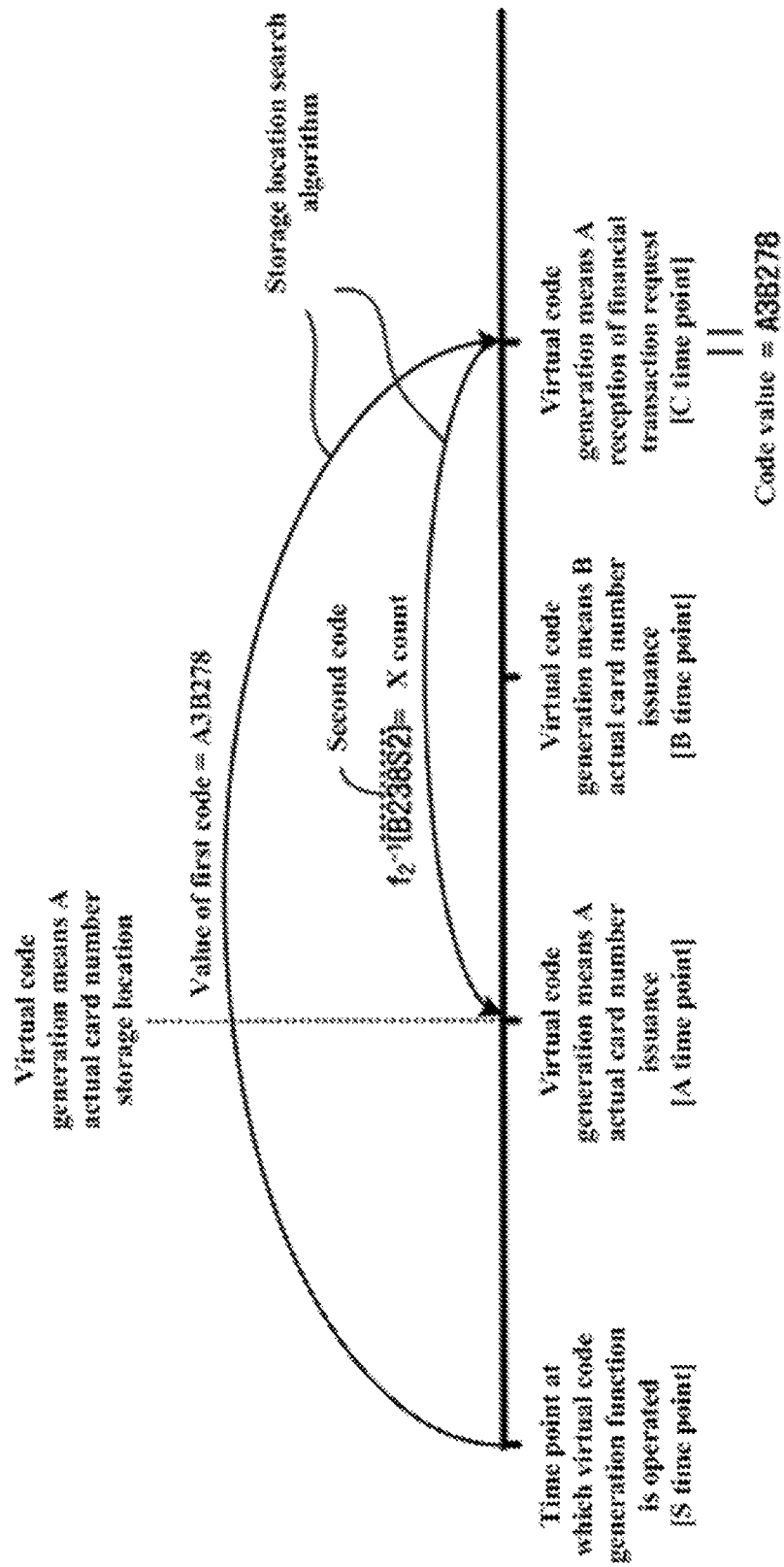
FIG. 14 is an exemplary view of a storage location search algorithm searching for a storage location by moving on a track based on a detailed code, according to an embodiment of the inventive concept.

Moreover, according to another embodiment, as illustrated in FIG. 14, when using the storage location search algorithm that moves on a track based on the first code and the second code, the virtual code verification means 20 may determine that the point on the track on which the pointer, which starts at a track start point from the time point at which the virtual code generation function is operated is positioned by moving the divided unit on the track whenever a unit count elapses at a time point ('A' time point), at which the actual card number is issued is the point matched with the storage location of the actual card number.

Figure 16:
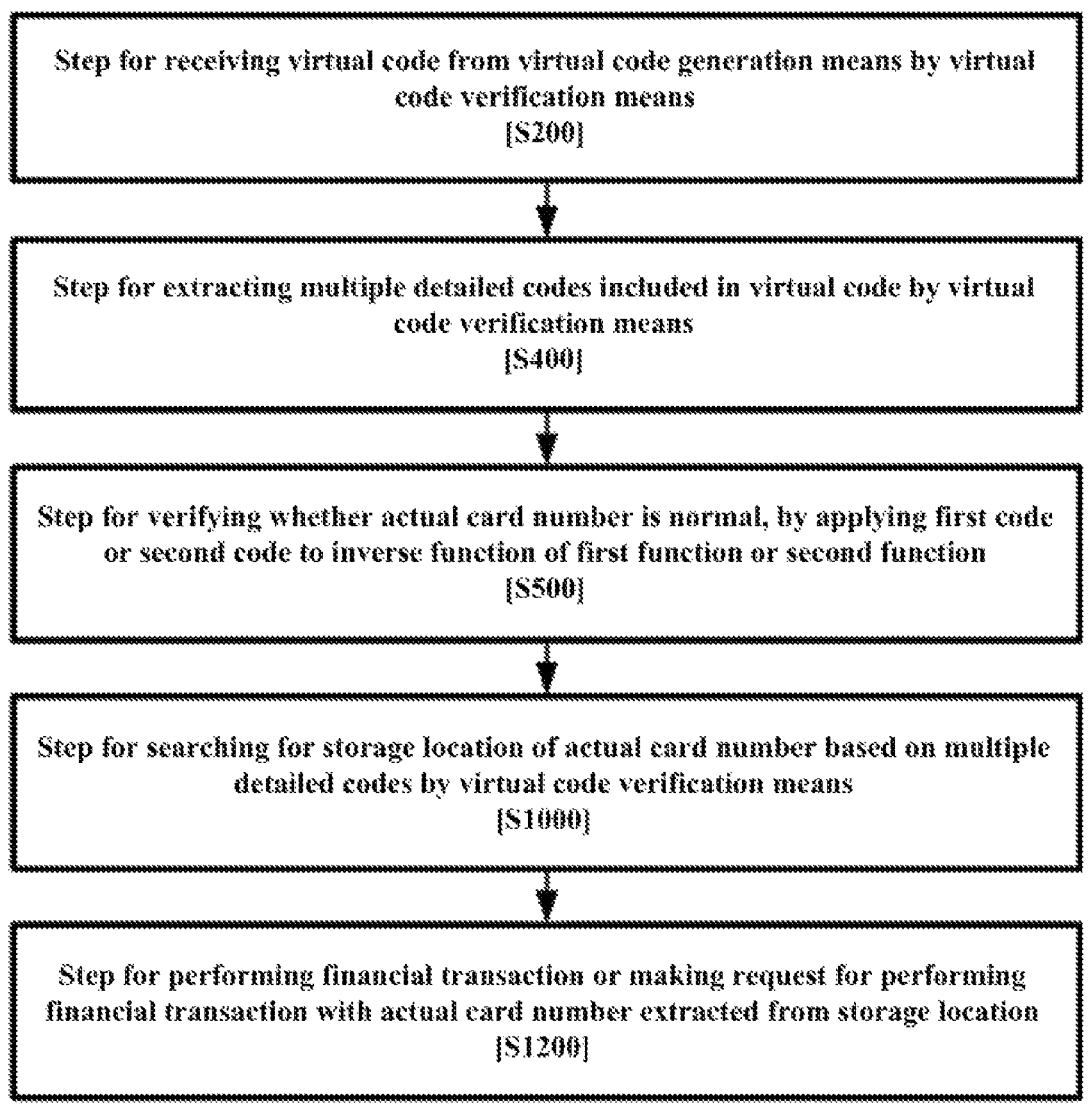
FIGS. 16 and 17 are flowcharts of a virtual code-based financial transaction providing method further including a step for verifying a virtual code, according to an embodiment of the inventive concept.

Moreover, according to another embodiment, as illustrated in FIG. 16, the virtual code verification means 20 further includes a step S500 of verifying whether the actual card number corresponds to the normally generated virtual code, by applying the first code or the second code to the inverse function of the first function or second function. For example, in the case where the first code is the code value corresponding to the number of counts elapsing from the first time point when the specific virtual code generation function and the storage location search algorithm within the virtual code verification means 20 are operated, and in the case where the second code is a code value corresponding to the number of counts elapsing after the actual card number is issued with respect to the specific virtual code generation means 10, the virtual code verification means 20 together stores time Ts elapsing until the actual card number is issued after the virtual code generation function is operated, when the actual card number in the storage location is stored. The virtual code verification means 20 may calculate the elapsed time T1 from a point in time, when the virtual code generation function is operated, to the virtual code generation time point by applying the inverse function of the first function to the first code within the virtual code and may calculate the elapsed time T2 from a point in time, when the actual card number is issued, to the virtual code generation time point by applying the inverse function of the second function to the second code within the virtual code. Afterward, the virtual code verification means 20 may verify the virtual code by determining the difference between T1 and T2 corresponds to Ts.

Figure 17:
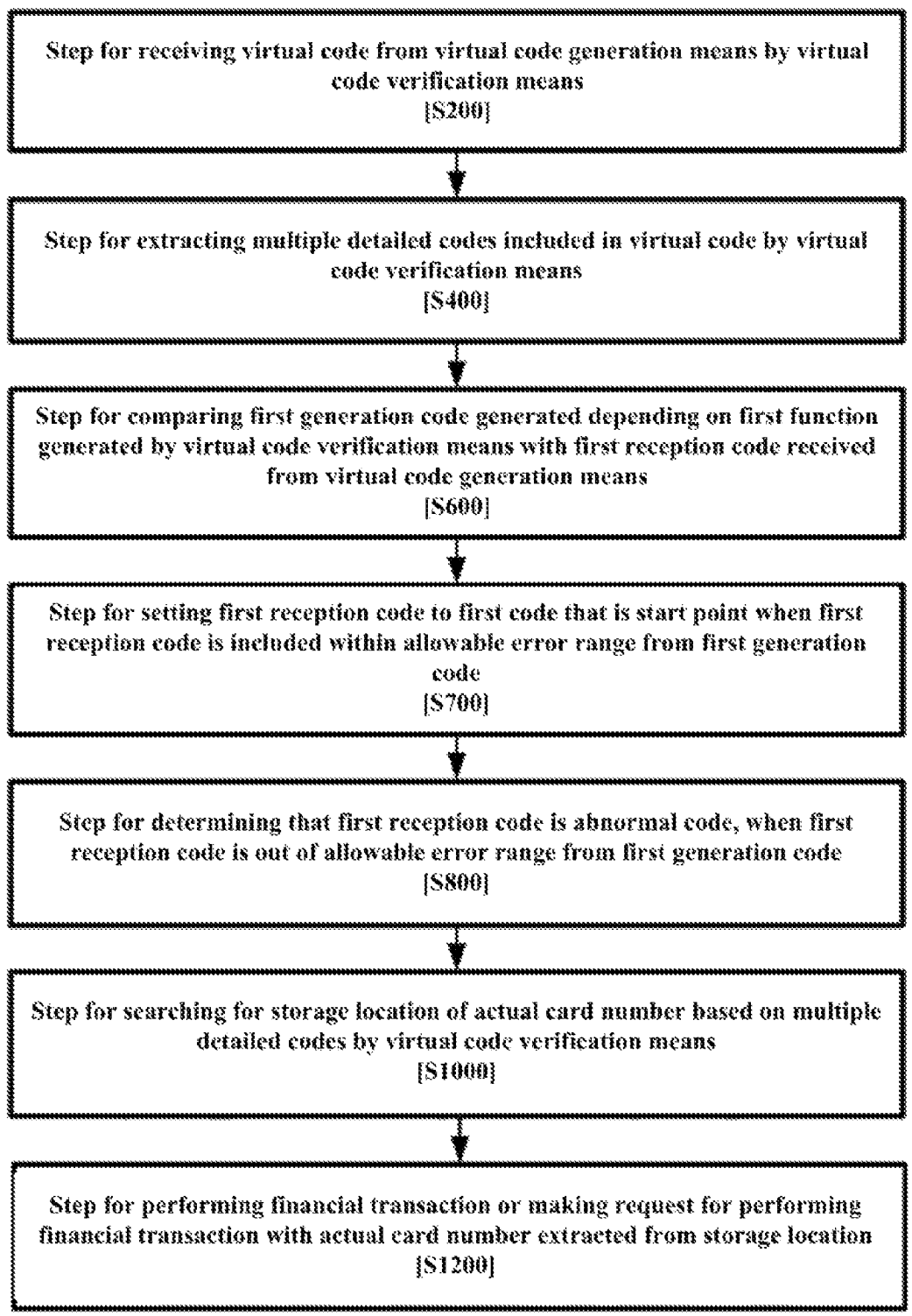

Moreover, according to another embodiment, as illustrated in FIG. 17, a step S600 for comparing the first generation code generated depending on the first function generated by the virtual code verification means 20 with the first reception code received from the virtual code generation means 10, a step S700 for setting the first reception code to the first code that is the start point when the first reception code is included within an allowable error range from the first generation code, and a step S800 for determining that the first reception code is an abnormal code, when the first reception code is out of the allowable error range from the first generation code may be further included. In the virtual code generation means 10 and the virtual code verification means 20, the same unit count elapses with time. However, there is an error between timers included in the virtual code generation means 10 and the virtual code verification means 20; the number of counts elapsing at the same time point may be different. Accordingly, it is necessary to determine the abnormal code that is not the normal virtual code, while removing the error caused by the timer. To this end, the virtual code verification means 20 may compare the first generation code, which is the first code internally generated at the specific count by the first function, with the first reception code, which is the first code within the virtual code received from the virtual code generation means 10, in S600, may perform a procedure of searching for the card number based on the first reception code after determining the normal code when the difference in count between the first generation code and the first reception code is within the allowable error range in S700, and may determine the abnormal code when the difference in count between the first generation code and the first reception code is out of the allowable error range in S800.

Moreover, according to another embodiment, when the virtual code further includes the virtual security code of the specific number of digits, a step for verifying the virtual code by determining, by the virtual code verification means, whether the reception virtual security code received from the virtual code generation means is the same as the generation virtual security code generated within the virtual code verification means is further included. The virtual security code may be generated to correspond to the number of digits of the card security code, and the digit of the card security code of the actual card number may be displayed.

According to an embodiment, the virtual security code may be generated based on the unique value and the card security code (e.g., CVC/CVV number) within the virtual code generation device. The unique value is a device unique value individually assigned for each virtual code generation device. The unique value and the card security code may be assigned to each of the virtual code generation devices 100; for the purpose of hacking a virtual code generation device for malicious purposes, a person that newly receives a virtual code generation function may not identify the unique value and the card security code assigned to a respective virtual code generation device. Accordingly, the virtual code verification means 20 may verify the virtual code generation means 10 by receiving the virtual security code generated based on unique value and card security code by the virtual code generation means 10.

Moreover, according to another embodiment, the virtual code generation means 10 may generate the virtual security code by reflecting the time value. That is, the virtual code generation means 10 may generate the virtual security code, using the OTP (user authentication using a randomly generated OTP instead of a fixed password) method. The virtual code verification means 20 receives the OTP number corresponding to the virtual security code from the virtual code generation means 10 and verifies the virtual code generation means 10 by comparing the OTP number, which is generated at the count within the specific range from the received count, with the OTP number from the virtual code generation means 10. That is, the virtual code verification means 20 may store the card security code (e.g., CVC/CVV) and the unique value within the storage location of the actual card number together and may verify the virtual code generation means 10 by determine whether the OTP number generated using the card security code and the unique value extracted from the storage space of the actual card number at a time point when the virtual code is received is the same as the OTP number received from the virtual code generation means 10.

Figure 18:
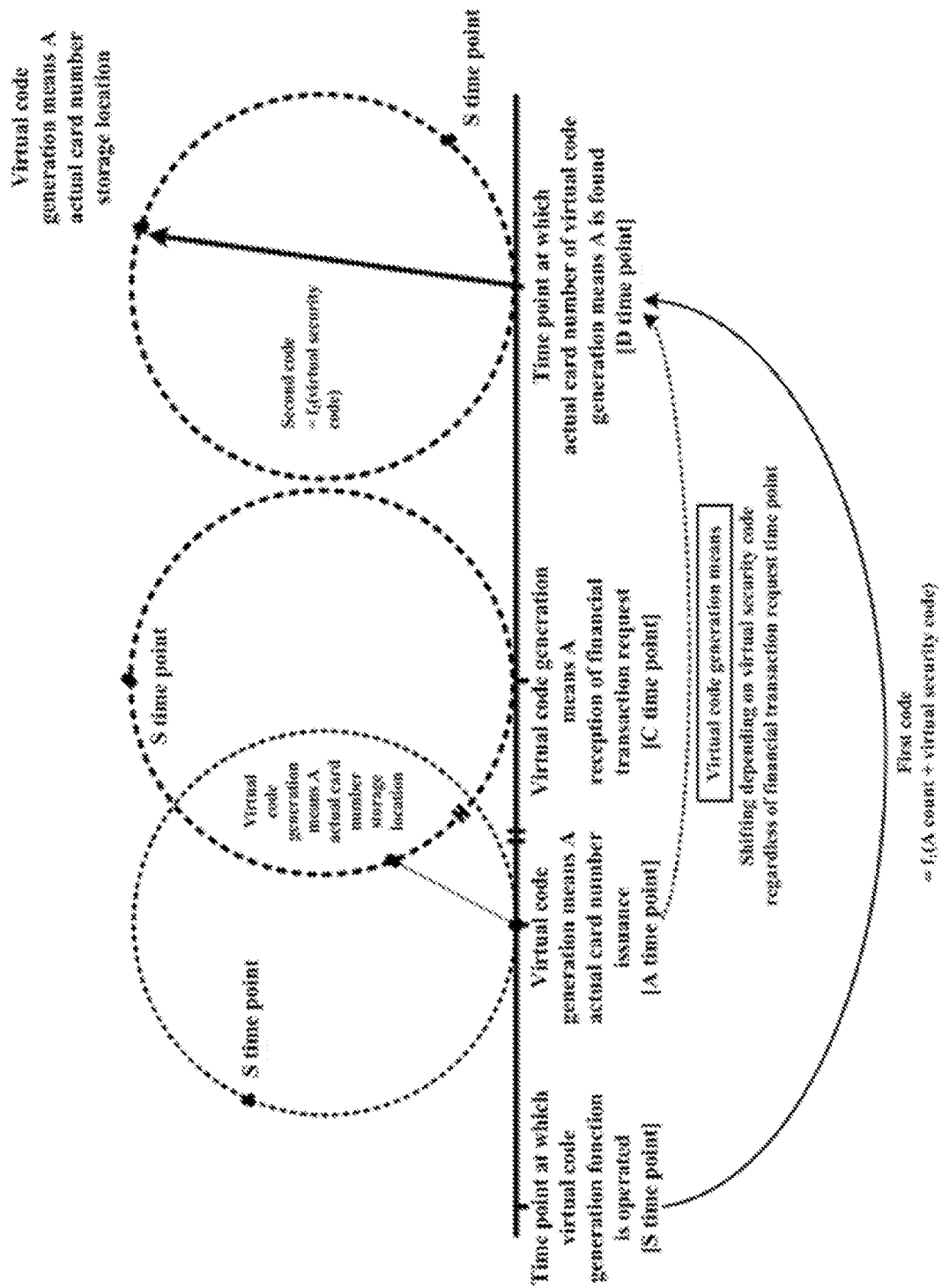
FIG. 18 is an exemplary view of a method of moving a time point of actual card number search using a virtual security code, according to an embodiment of the inventive concept.

Moreover, according to another embodiment, the virtual security code may be reflected by generating the first code and the second code without outputting the virtual code generation means to the outside. As illustrated in FIG. 18, the virtual code generation means 10 generates the first code of the count, to which the virtual security code value generated based on the unique value and the card security code within the virtual code generation device is added at a time point when the card number is issued, and generates the second code of the count corresponding to the virtual security code value. That is, the first code and the second code is generated based on the count shifted by the value of the virtual security code from a time point 'A' at which the actual card number is issued in the virtual code generation device A. The count shifted from the time point 'A' may be a count earlier or later than the count corresponding to the present time point depending on the generated virtual security code value. The virtual code verification means 20 may search for the point with matched which the storage location of the actual card number, by applying the received first code and the received second code to the storage location search algorithm. As such, it is impossible for other people to identify the order in which the first code and the second code constituting the virtual code, thereby improving the security.

Furthermore, in another embodiment, after extracting the virtual security code from the second code generated based on the virtual security code, the virtual code verification means 20 (i.e., OTP function) may determine whether there is a value the same as the virtual security code among the calculated OTP numbers, by entering the count within a specific range from the count, at which the virtual code is received, into the virtual security code generation function (i.e., OTP function). The virtual code verification means obtains the virtual security code value (i.e., an OTP function value) used to generate the second code by applying the inverse function of the second function to the second code and searches for the count at which a value the same as the virtual security code value is calculated. As the difference between a time point at which the virtual security code is generated by the virtual code generation means and a time point at which the virtual code verification means receives the virtual security code is present due to the transmission time of the virtual code or delay, the count at which the virtual code verification means 20 receives the virtual code may not be the same as a count at which the OTP number corresponding to the virtual security code is generated, and thus the virtual code verification means 20 allows an error range from the count at which the virtual code is received. In this way, the virtual code verification means 20 may verify whether the virtual code generation means transmitting the virtual code is normally matched with the actual card number, thereby improving the security. Moreover, because the virtual code verification means 20 searches for the virtual security code to verify the virtual code generation means 10 even though the user does not enter the virtual security code of specific digits upon entering the virtual code, the user may easily utilize the virtual code generation means 10.

Moreover, according to another embodiment, the virtual code generation means 10 may generate the first code corresponding to the count obtained by adding the virtual security code value generated based on the unique value and the card security code within the virtual code generation device at a time point at which the financial transaction is requested and may generate the second code corresponding to the count obtained by adding the value of the virtual security code and the count difference between the actual card number issuance time point ('A' time point) and the financial transaction request time point ('C' time point). That is, the equation in which the virtual code generation means 10 generates the first and second codes is as follows.

First code=$f_1$(count at time point C+virtual security code)

Second code=$f_2$(count at time point 'C'−count at time point 'A'+virtual security code)

(Time point 'A': a time point at which an actual card number is issued, time point 'C': a count at a time point of financial transaction request, virtual security code: OTP number)

The virtual code verification means 20 searches for the storage location of the actual card number based on the first code and the second code within the received virtual code and extracts the card security code (i.e., CVV or CVC) included in the storage location of the actual card number and the unique value of the virtual code generation device 100. The virtual code verification means 20 generates a virtual security code (i.e., an OTP number) based on the card security code and the unique value within a specific count range from a time point at which a financial transaction request is received. Afterward, the virtual code verification means 20 may determine whether there is a count at which the number of counts (i.e., a value obtained by applying the inverse function of the second function to the second code) corresponding to the second code is the same as the sum of the number of counts to each count within a specific count range from a time point when the financial transaction request is received from the actual card number issuance time point ('A' time point) and the virtual security code (i.e., OTP number). As the virtual code verification means searches for the point to which the storage space of the actual card number is matched, based on the first code and the second code, the virtual code verification means grasps the registration time point of the actual card number. In this way, the virtual code verification means 20 may determine whether the virtual code provided by the virtual code generation means 10 is issued normally.

Furthermore, in another embodiment, in the case where the virtual code verification means 20 includes the OTP code and the extraction code in the virtual code as a plurality of detailed codes, the virtual code verification means 20 may shift to the count corresponding to the extraction code, which does not coincide with a payment request time when the extraction code is used as the first code and may shift to the count corresponding to the conversion code, which does not coincide with a payment request time when the conversion code calculated based on the OTP code is used as the first code. The count corresponding to the first code on a track may be before or after the current time point. At this time, because the OTP code is extracted from the virtual code, the virtual code verification means 20 may determine whether there is a virtual code the same as an OTP code extracted from the virtual code among the comparison code (i.e., an OTP value) generated based on the OTP function at a count within a specific range from the received count, and then may determine whether the virtual code is issued normally.

The virtual code-based financial transaction providing method according to an embodiment of the inventive concept may be implemented by a program (or an application) and may be stored in a medium such that the program is executed in combination with a computer being hardware.

For the computer to read the program and to execute the method implemented by the program, the program may include a code that is coded in a computer language, which a processor (e.g., a central processing unit CPU) of the computer may read through a device interface of the computer, such as C, C++, JAVA, or a machine language. The code may include a functional code related to a function that defines necessary functions that execute the method, and the functions may include an execution procedure related control code necessary for the processor of the computer to execute the functions in its procedures. Further, the code may further include additional information that is necessary for the processor of the computer to execute the functions or a memory reference related code on which location (address) of an internal or external memory of the computer should be referenced by the media. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

The inventive concept has the following various effects.

First, an algorithm for generating a virtual code and for searching for an actual card number may be added to only the virtual code generation device and the virtual code verification device (e.g., a financial company server), and thus the conventional process using the actual card number may be maintained as it is. For example, when the virtual code is generated without duplication and is provided to a smart card or an app, a POS device and a PG server transmits the virtual code to a card issuer server while being maintained as it is and then the card issuer server may search for the actual card number corresponding to the virtual code to make a payment. As such, a portion to be changed in the conventional process may be minimized to increase security and the user does not need to perform an additional step to improve security. In particular, because the combination of an OTP code and an extraction code using only the number in the limited variable range within a virtual code, the whole process from a payment terminal to a payment server does not need to be modified.

Second, as the OTP code of fewer digits capable of being generated as a conversion code used as a first code or a second code in the storage location search of the actual card number is included in a virtual code, lots of portion of the variable range (e.g., the range other than the digits of the fixed code and the verification number in the digits of card identification number and a card security code range) is allocated to the extraction code used as the first code or the second code, and thus the number of numeral strings capable of being used as the extraction code may increase and the security may be improved.

Third, with the shift to the count corresponding to the conversion code generated based on the OTP code or the extraction code extracted from the virtual code, the actual card number is found based on a time point, not the current time point, and thus the security may be improved because hackers may not understand the virtual code generation rule.

Fourth, because the actual card number is matched with a count different for each user and is stored in the count, the virtual code in which the first code or the second code (or the conversion code and the detailed code corresponding to the first code and the second code) is matched with another user may not be generated. Thus, the virtual code verification means may accurately identify the user by the virtual code.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A virtual code generation device, the device comprising:
   a processor configured to:
   generate one or more detailed codes; and
   generate a virtual code by combining the one or more detailed codes;
   a communication module comprising a Near-Field Communication (NFC) antenna module or a Bluetooth communication module, and configured to transmit the virtual code to an external device to provide the virtual code; and
   a memory configured to store code generation function data,
   wherein the virtual code is generated by combining a plurality of codes including a fixed code, a One-Time Password (OTP), and an extraction code depending on a specific rule,
   wherein the fixed code is a code that is combined at a predetermined location in the virtual code and determines a card issuer or a card type corresponding to an actual card number,
   wherein the OTP code is generated with a specific number of numeric arrays based on an OTP function included in the code generation function data and is used to calculate a conversion code,
   wherein the extraction code is generated with all or part of the number of numbers other than the fixed code and the OTP code in a total number of numbers of the virtual code and corresponds to the conversion code calculated from the OTP code,
   wherein the conversion code or the extraction code is used as a first code or a second code under a condition set by a virtual code verification means,
   wherein the first code is to set a start point for searching for a storage location of the actual card number in a memory of the external device that is connected via the NFC antenna module or the Bluetooth communication module,
   wherein the second code is to set a search path from the start point to the storage location depending on a specific search method that is determined by a storage location search algorithm that performs a cloud movement in a storage space of the memory,
   wherein the OTP code and the extraction code are changed for each unit count, and
   wherein the unit count is set to a specific time interval and is changed as the time interval elapses.

2. The device of claim 1, wherein the OTP code is generated as the number of numbers of a card security code in the actual card number, and
   wherein the extraction code is generated with all or part of the number of numbers other than the fixed code, the OTP code, and an expiration date in the total number of numbers of the virtual code.

3. The device of claim 2, wherein the conversion code is generated with the number of digits the same as the extraction code.

4. The device of claim 2, wherein the conversion code is one-to-one matched with the OTP code depending on a specific rule.

5. The device of claim 3, wherein the conversion code is calculated by entering a count value, at which generation of the OTP code and the virtual code is requested, into a conversion code generation function as a seed value.

6. The device of claim 1, wherein the processor is further configured to:
   combine the OTP code and the extraction code through a detailed code combining function; and
   list the combined code at a digit other than the fixed code and a digit of a card security code in a card identification number.

7. The device of claim 1, wherein the processor is further configured to generate a specific number combination positioned at a digit of an expiration date, as a variable code when the fixed code is newly assigned to the virtual code of a specific card type,
   wherein the conversion code is generated using the variable code and the OTP code as a seed value, and
   wherein the number combination is changed and generated for each unit count, is capable of being used as an actual expiration date, and is included in a maximum period from a current count.

8. The device of claim 1, wherein the processor is further configured to determine whether the virtual code generated at a specific count is a code string capable of being used as the actual card number in a specific card type, when the fixed code is used for the actual card number of the specific card type.

9. The device of claim 8, wherein the processor is further configured to:
   generate a comparison card security code by entering a card identification number, an expiration date, and a service code within the virtual code into an actual card number generation rule;
   compare a generation card security code being a number positioned at a digit of a card security code within the virtual code with the comparison card security code; and
   when the generation card security code is the same as the comparison card security code, make a request for again generating the virtual code.

* * * * *

UNITED STATES PATENT AND TRADEMARK OFFICE
CERTIFICATE OF CORRECTION

PATENT NO. : 11,935,044 B2
APPLICATION NO. : 16/659043
DATED : March 19, 2024
INVENTOR(S) : Chang Hun Yoo Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this
Twenty-ninth Day of April, 2025

Coke Morgan Stewart
*Acting Director of the United States Patent and Trademark Office*